United States Patent
Kim et al.

(10) Patent No.: US 10,644,783 B2
(45) Date of Patent: May 5, 2020

(54) METHOD AND APPARATUS FOR TRANSMITTING CONTROL CHANNEL IN WIRELESS COMMUNICATION SYSTEM

(71) Applicant: SAMSUNG ELECTRONICS CO., LTD., Suwon-si (KR)

(72) Inventors: Yohan Kim, Suwon-si (KR); Namkoo Kang, Suwon-si (KR); Hyoyol Park, Suwon-si (KR); Keunchul Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/281,265

(22) Filed: Feb. 21, 2019

(65) Prior Publication Data

US 2019/0260461 A1 Aug. 22, 2019

(30) Foreign Application Priority Data

Feb. 20, 2018 (KR) .................. 10-2018-0019807

(51) Int. Cl.
*H04B 7/15* (2006.01)
*H04B 7/155* (2006.01)
(Continued)

(52) U.S. Cl.
CPC ........... *H04B 7/15542* (2013.01); *H04B 7/06* (2013.01); *H04B 7/0617* (2013.01);
(Continued)

(58) Field of Classification Search
CPC ............. H04B 7/15542; H04B 7/0617; H04B 7/0626; H04B 7/0695; H04B 7/15592;
(Continued)

(56) References Cited

U.S. PATENT DOCUMENTS

2009/0232010 A1  9/2009  Li et al.
2017/0207843 A1  7/2017  Jung et al.
(Continued)

FOREIGN PATENT DOCUMENTS

KR  10-2010-0108464 A  10/2010
WO  2017/221202 A1  12/2017

OTHER PUBLICATIONS

Samsung, "BSI Reporting on PUCCH", 3GPP TSG RAN WG1 Meeting 90bis, R1-1717659, Prague, CZ, Oct. 2, 2017, 6 pages.
(Continued)

*Primary Examiner* — Michael R Neff
(74) *Attorney, Agent, or Firm* — Sughrue Mion, PLLC

(57) ABSTRACT

Provided are a method and a Base Station (BS) for transmitting a control channel and a method and a User Equipment (UE) for receiving a control channel in a wireless communication system. The BS includes: a transceiver; and at least one processor configured to control the transceiver to receive Beam State Information (BSI) from the UE through at least one first beam, identify a second beam, based on the BSI, and control the transceiver to transmit a first BSI request to the UE through the second beam, identify a third beam, based on information on the at least one first beam, and determine whether control the transceiver to transmit the control channel to the UE through the third beam.

22 Claims, 20 Drawing Sheets

(51) Int. Cl.
  *H04B 7/06* (2006.01)
  *H04W 88/10* (2009.01)
  *H04W 72/08* (2009.01)
  *H04W 72/04* (2009.01)
  *H04B 7/0413* (2017.01)
  *H04W 92/10* (2009.01)
(52) U.S. Cl.
  CPC ......... *H04B 7/0626* (2013.01); *H04B 7/0695* (2013.01); *H04B 7/15592* (2013.01); *H04W 72/0406* (2013.01); *H04W 72/085* (2013.01); *H04W 88/10* (2013.01); *H04B 7/0413* (2013.01); *H04W 92/10* (2013.01)
(58) Field of Classification Search
  CPC .......... H04W 72/0406; H04W 72/085; H04W 88/10
  USPC ........................................................ 375/211
  See application file for complete search history.

(56) References Cited

U.S. PATENT DOCUMENTS

2017/0302341 A1    10/2017  Yu et al.
2017/0346534 A1    11/2017  Islam et al.
2018/0167883 A1*   6/2018   Guo ................... H04W 72/046
2018/0227887 A1*   8/2018   Hakola ................. H04B 7/022

OTHER PUBLICATIONS

International Search Report (PCT/ISA/210) dated May 27, 2019 issued by the International Searching Authority in International Application No. PCT/KR2019/001987.
Written Opinion (PCT/ISA/237) dated May 27, 2019 issued by the International Searching Authority in International Application No. PCT/KR2019/001987.

* cited by examiner

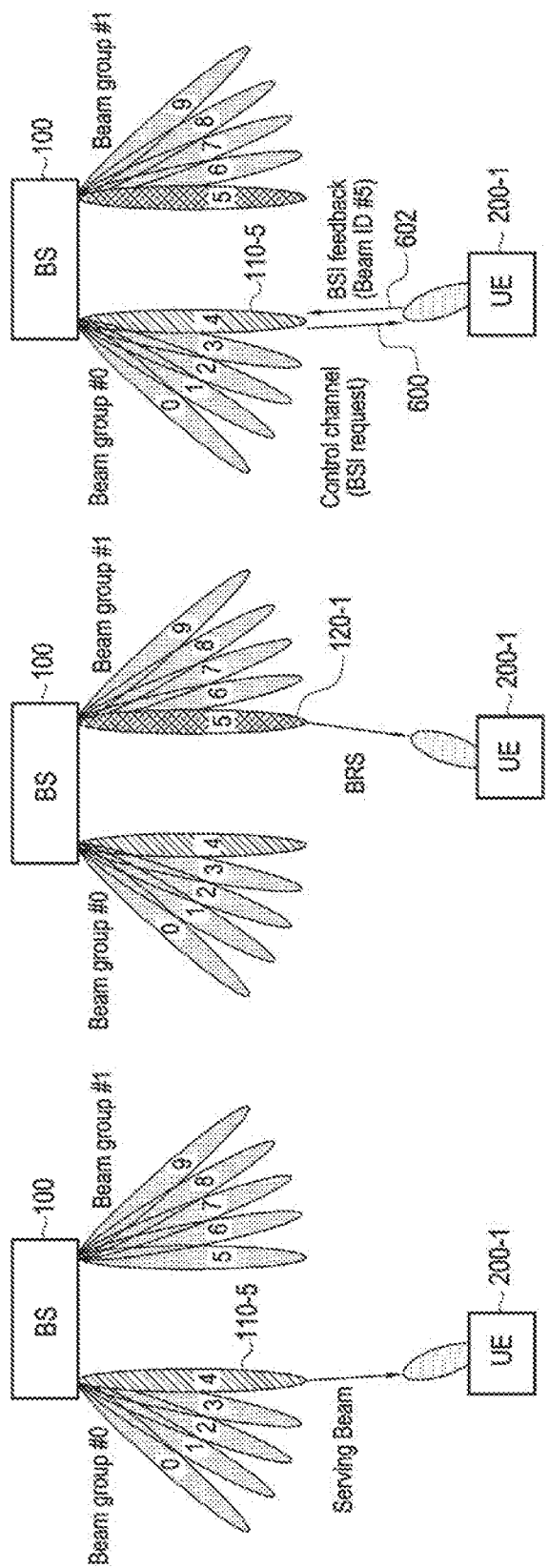

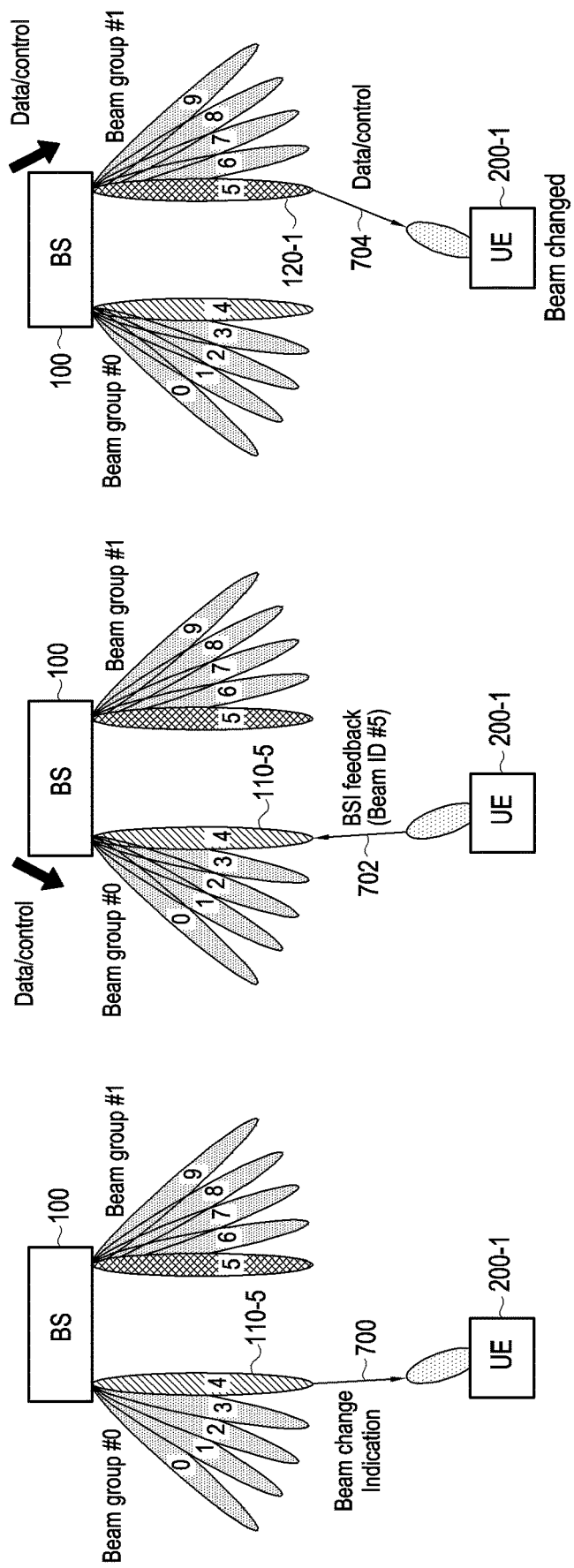

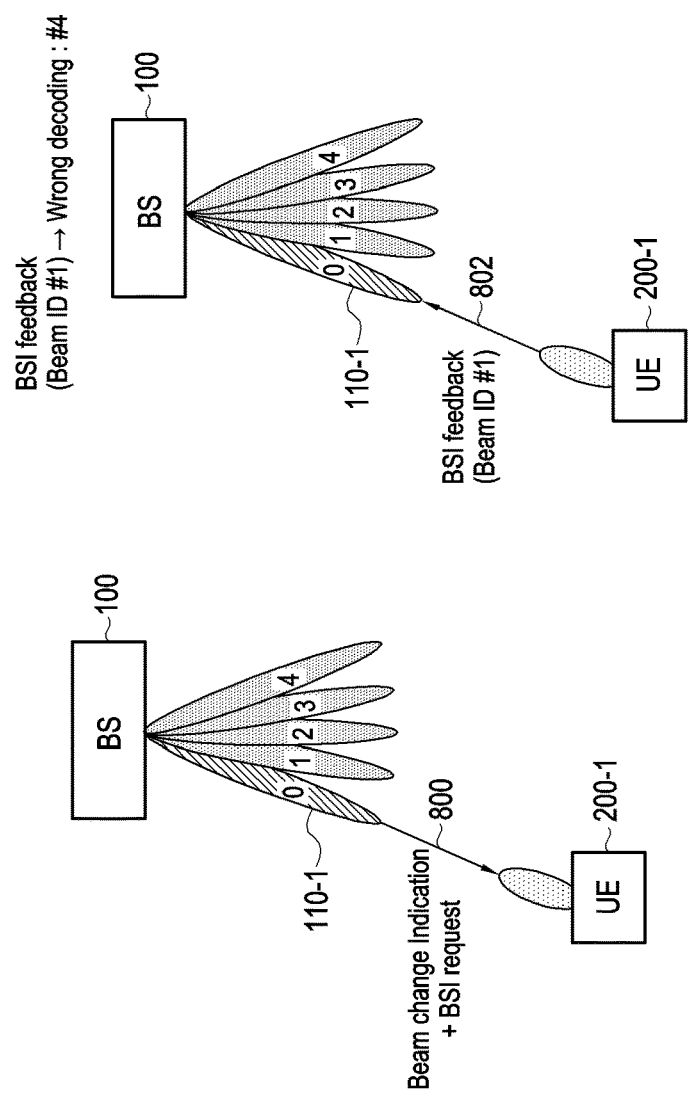

METHOD AND APPARATUS FOR TRANSMITTING CONTROL CHANNEL IN WIRELESS COMMUNICATION SYSTEM

CROSS-REFERENCE TO RELATED APPLICATION

This application is based on and claims priority under 35 U.S.C. § 119 to Korean Patent Application No. 10-2018-0019807, filed on Feb. 20, 2018, in the Korean Intellectual Property Office, the entire content of which is hereby incorporated by reference.

BACKGROUND

1. Field

The disclosure relates to a method and an apparatus for transmitting a control channel, and a method and an apparatus for receiving a control channel.

2. Description of Related Art

In order to meet wireless data traffic demands, which have increased since the commercialization of 4G communication systems, efforts to develop improved 5G communication systems or pre-5G communication systems have been made. For this reason, 5G communication systems or pre-5G communication systems are called beyond-4G-network communication systems or post-LTE systems.

In order to achieve a high data transmission rate, implementation of the 5G communication system in a mmWave band (for example, a 60 GHz band) is being considered. To mitigate propagation path loss in the mmWave band and increase the propagation transmission distance, technologies such as beamforming, massive multiple-input multiple-output MIMO, Full-Dimensional MIMO (FD-MIMO), array antennas, analog beamforming, and large-scale antenna technologies are being discussed.

Further, in 5G communication systems, development for system network improvement is under way based on an evolved small cell, an advanced small cell, a cloud Radio Access Network (RAN), an ultra-dense network, Device-to-Device communication (D2D), a wireless backhaul, a moving network, cooperative communication, Coordinated Multi-Points (CoMP), and reception-end interference cancellation. In addition, the 5G system has developed Advanced Coding Modulation (ACM) schemes such as Hybrid frequency shift keying (FSK) and quadrature amplitude modulation (QAM) Modulation (FQAM) and Sliding Window Superposition Coding (SWSC), and advanced access technologies such as Filter Bank Multi Carrier (FBMC), Non-Orthogonal Multiple Access (NOMA), and Sparse Code Multiple Access (SCMA).

Meanwhile, the Internet has evolved from a human-oriented connection network, in which humans generate and consume information, to an Internet-of-Things (IoT) network in which distributed components such as objects exchange and process information. Internet-of-Everything (IoE) technology, in which big-data processing technology is combined with IoT technology through a connection with a cloud server or the like, has also emerged. In order to implement IoT, technical factors such as sensing techniques, wired/wireless communication, network infrastructure, service-interface technology, and security technology are considered, and research on technologies such as sensor networks, Machine-to-Machine (M2M) communication, Machine-Type Communication (MTC), and the like for connection between objects has recently been conducted. In an IoT environment, through collection and analysis of data generated in connected objects, an intelligent Internet Technology (IT) service may be provided in order to create new value in peoples' lives. The IoT may be applied to fields such as those of smart homes, smart buildings, smart cities, smart cars, connected cars, smart grids, health care, smart home appliances, or high-tech medical services through the convergence of related art Information Technology (IT) and various industries.

Accordingly, various attempts to apply 5G communication to the IoT network are being made. For example, technologies such as sensor networks, Machine-to-Machine (M2M), and Machine-Type Communication (MTC) are implemented by beamforming, MIMO, and array-antenna schemes. The application of a cloud RAN as big-data processing technology is an example of the convergence of 5G technology and IoT technology.

In a downlink, the role of a control channel is very important in transmitting data and maintaining connectivity. Current communication systems including an LTE system operate a downlink control channel named a Physical Downlink Control Channel (PDCCH). A Base Station (BS) transmits most information (for example, allocated resource blocks, an allocated Transmission Time Interval (TTI), a Modulation Coding Scheme (MCS), Hybrid Automatic Repeat and request (HARQ)-related information, rank, and precoding information) of data allocation information in the downlink and uplink through the PDCCH. User Equipment (UE) receives data through the downlink and/or transmits data through the uplink on the basis of the transmitted allocation information.

The PDCCH may play the same role in an mmWave band 5G system based on beamforming. However, there are two significant differences as compared to LTE, which is not a beamforming-based system. First, the PDCCH may be transmitted through a beam corresponding to a particular UE in the mmWave band 5G system. Second, the PDCCH may transmit not only data, but also a Beam State Information (BSI) request and a Beam Change Indication (BCI) in the mmWave band 5G system. At this time, the BSI serves to secure a beam reception state of the UE and the BCI serves to inform the UE of a beam change.

In 5G systems, beamforming is a scheme of achieving an antenna gain in order to compensate for high path loss in the mmWave band, and is capable of performing transmission and reception with a predetermined quality or higher only within a narrow coverage area in both horizontal and vertical directions, in comparison with coverage of a sector antenna BS of LTE. Accordingly, in order to serve the sector coverage of a low-frequency band such as that of LTE, the 5G BS has restrictions in that the BS should provide a service with appropriate beams between the BS and the UE by configuring beams in various directions and steering the beams in various directions in a short time. For the same reason, the UE should also operate various narrow beams having a large antenna gain. Due to such restrictions, there are also restrictions in that all signals including the PDCCH should be transmitted through a beam suitable for a particular UE in the mmWave band. Accordingly, managing an operation for determining beams suitable for transmission and reception between the BS and the UE and maintaining the same is required.

Since beams suitable for transmission and reception between the BS and the UE may vary depending on the communication state, the beams for transmission and reception between the BS and the UE may be changed. A change in the beams used by the BS and the UE may be determined by the BS on the basis of beam state information measured by the UE, and the BS may transmit the beam change to the UE. Alternatively, the UE may determine beams having the best performance and make a request for changing the beams to the BS. When the beam change is incorrectly performed, transmission/reception performance may deteriorate. Moreover, in this case, the beams may be changed to a direction in which communication is impossible, and thus communication becomes impossible for a predetermined time.

SUMMARY

Provided are a method and an apparatus for transmitting a control channel in a wireless communication system, a method and an apparatus for preventing communication disconnection that may occur due to a beam change when a control channel is transmitted through a beam in a wireless communication system, and a method and an apparatus for preventing communication disconnection that may occur due to a beam group change when a control channel is transmitted through a beam group in a wireless communication system.

In accordance with an aspect of the disclosure, there is provided a method of transmitting a control channel by a Base Station (BS). The method includes: transmitting, to a User Equipment (UE) through at least one first beam, a first Beam State Information (BSI) request; receiving, from the UE through the at least one first beam, a first BSI request feedback; identifying a second beam, based on the first BSI request feedback; transmitting, to the UE through the second beam, a second BSI request; identifying a third beam, based on information on the at least one first beam; and transmitting, to the UE through the third beam, the control channel.

In accordance with an aspect of the disclosure, there is provided a Base Station (BS) transmitting a control channel. The BS includes: a transceiver; and at least one processor configured to: control the transceiver to transmit, to a User Equipment (UE) through at least one first beam, a first Beam State Information (BSI) request, and to receive, from the UE through the at least one first beam, a first BSI request feedback, identify a second beam, based on the first BSI request feedback, control the transceiver to transmit, to the UE through the second beam, a second BSI request, identify a third beam, based on information on the at least one first beam, and control the transceiver to transmit, to the UE through the third beam, the control channel.

In accordance with an aspect of the disclosure, there is provided a method of receiving a control channel by a User Equipment (UE). The method includes: receiving, from a Base Station (BS) through at least one first beam, a first Beam State Information (BSI) request; transmitting, to the BS through the at least one first beam, a first BSI request feedback; receiving, from the BS through a second beam, a second BSI request; and receiving, from the BS through a third beam, the control channel, wherein the second beam is identified based on the first BSI request feedback and the third beam is identified based on information on the at least one first beam.

In accordance with an aspect of the disclosure, there is provided a User Equipment (UE) receiving a control channel. The UE includes: a transceiver; and at least one processor configured to: control the transceiver to receive, from a Base Station (BS) through at least one first beam, a first Beam State Information (BSI) request, control the transceiver to transmit, to the BS through the at least one first beam, a first BSI request feedback, control the transceiver to receive, from the BS through a second beam, a second BSI request, and control the transceiver to receive, from the BS through a third beam, the control channel, wherein the second beam is identified based on the first BSI request feedback and the third beam is identified based on information on the at least one first beam.

In accordance with an aspect of the disclosure, there is provided a method of transmitting a control channel by a Base Station (BS). The method includes: receiving, from a User Equipment (UE) through at least one first beam, first Beam State Information (BSI); determining a second beam, based on the first BSI; transmitting, to the UE through the determined second beam, a BSI request; determining a third beam, based on information on the at least one first beam; and determining whether to transmit, to the UE through the determined third beam, the control channel.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments will be more apparent from the following detailed description taken in conjunction with the accompanying drawings, in which:

FIGS. 4 to 5, 6A to 6C, and 7A to 7C illustrate a beam change process according to one or more embodiments;

FIGS. 8A to 8C, 9A to 9C, and 10 illustrate a case in which a beam change is incorrectly performed according to one or more embodiments;

DETAILED DESCRIPTION

Figure 1:
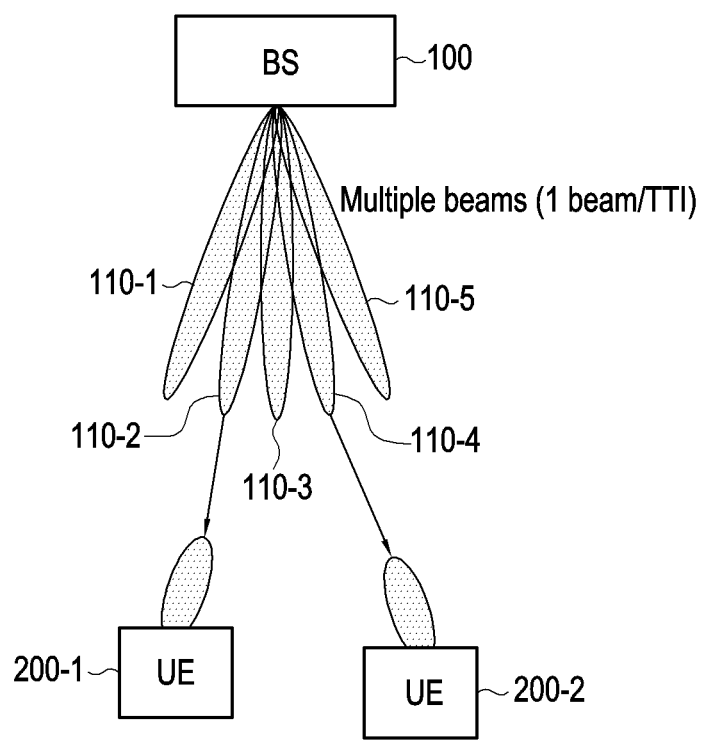
FIG. 1 is a system diagram illustrating a wireless communication system according to an embodiment.

In describing embodiments, detailed descriptions of technologies that are already known to those skilled in the art and are not directly related to the disclosure may be omitted. Similarly, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure. Throughout the specification, the same or like reference numerals designate the same or like elements.

As used herein, a "unit" refers to a software element and/or a hardware element, such as a Field Programmable Gate Array (FPGA) or an Application Specific Integrated Circuit (ASIC), which performs a predetermined function. However, the "unit" does not always have a meaning limited to software or hardware. The "unit" may be configured either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. Functions provided by the elements and the "units" may be either combined into a smaller number of elements and "units" or further divided into a larger number of additional elements or "units." In addition, the elements and "units" may be implemented to reproduce one or more processors or CPUs within a device or a security multimedia card.

The specific terms used herein are provided for ease of understanding the disclosure, and such specific terms may be changed into other forms without departing from the spirit and scope of the disclosure.

The expressions "A and/or B," "A or B," "at least one of A and B," "at least one of A or B," "one or more of A and B," and "one or more of A or B," as used herein, may include all possible combinations of the items that are enumerated together. For example, the term "A and/or B" or "at least one of A and B" may designate (1) at least one A, (2) at least one B, or (3) both of at least one A and at least one B.

Further, while the present disclosure describes various embodiments using terms used in some communication standards by way of example, it is understood that one or more embodiments may be applicable to other communication systems.

Hereinafter, expressions such as "greater than" or "less than" are used by way of example and expressions such as "greater than or equal to" or "less than or equal to" are also applicable and not excluded. For example, a condition defined with "greater than or equal to" may be replaced by "greater than" (or vice-versa), a condition defined with "less than or equal to" may be replaced by "less than" (or vice-versal), etc.

As used herein, the term "base station" is a subject communicating with a User Equipment (UE), and may be referred to as a BS, a NodeB (NB), a gNodeB (gNB), an eNodeB (eNB), an Access Point (AP), or the like.

The term "terminal" used in this specification may refer to a mobile station (MS), user equipment (UE), a user terminal (UT), a wireless terminal, an access terminal (AT), a terminal, a subscriber unit, a subscriber station (SS), a wireless device, a wireless communication device, a wireless transmission/reception unit (WTRU), a moving node, a mobile, or other terms. Various embodiments of a terminal may include a cellular phone, a smart phone having a wireless communication function, a personal digital assistant (PDA) having a wireless communication function, a wireless modem, a portable computer having a wireless communication function, a photographing device, such as a digital camera, having a wireless communication function, a gaming device having a wireless communication function, a home appliance for storing and reproducing music that has a wireless communication function, an Internet home appliance capable of performing wireless Internet access and browsing, and portable units or terminals having integrated combinations of the functions thereof. Furthermore, a terminal may include, but is not limited to, a machine-to-machine (M2M) terminal and a machine-type communication (MTC) terminal/device. In the specification, the UE may also be referred to as an electronic device.

The term "beam group" used in this specification is a unit including at least one beam and corresponds to a unit of beams to which a subframe, that is, one time resource (for example, TTI) is allocated. Only one of at least one beam included in one beam group may receive the time resource. That is, during one time resource (subframe or TTI), only one beam included in one beam group may be allocated (that is, only the allocated beam can be transmitted/received during the time resource), and the remaining beams included in the beam group cannot be simultaneously allocated during the time resource. Accordingly, the BS or the UE may sequentially use beams one-by-one included in one beam group but may simultaneously use two or more beams during a particular time resource. However, when the BS (or the UE) uses a plurality of beam groups, the BS or UE may transmit and receive each beam included in each of a plurality of beam groups (that is, a plurality of beams) during the particular time resource. For example, when it is assumed that a Radio Unit (RU) such as a Remote Radio Head (RRH) connected to a Digital Unit (DU) performs transmission/reception using only one beam group, the beam group may refer to the RU. However, the disclosure is not limited to the case in which the RU transmits only one beam group, and the RU may transmit a plurality of beam groups.

Hereinafter, certain embodiments of the disclosure will be described with reference to the drawings.

FIG. 1 is a system diagram illustrating a wireless communication system 10 according to an embodiment. As illustrated in FIG. 1, a wireless communication system 10 includes a BS 100, a first UE 200-1 (e.g., terminal), and a second UE 200-2 (e.g., terminal). In FIG. 1, the BS 100 includes one beam group including a plurality of beams 110-1 to 110-5. It is understood, however, that one or more other embodiments are not limited thereto, and the BS may include a plurality of beam groups, and the number of beams 110-1 to 110-5 included in one beam group may be variable. Further, in FIG. 1, the BS 100 communicates with two UEs, that is, the first UE 200-1 and the second UE 200-2. It is understood, however, that one or more other embodiments are not limited thereto, and the number of UEs may vary. Hereinafter, a method according to the disclosure is performed by the first UE 200-1 but may be performed by the second UE 200-2.

The BS 100 communicates with the first UE 200-1 through a beamforming antenna.

Specifically, the BS 100 may periodically or aperiodically transmit a Beam Reference Signal (BRS) of the BS 100 to the first UE 200-1 and may transmit a Beam State Information (BSI) request that makes a request for BSI feedback. Here, the BSI is an expression collectively referring to information indicating a beam status. For example, the BSI may include a beam index and Reference Signal Received Power (RSRP) of the beam. The BSI feedback may be feedback for (or responsive to) a BSI request, that is, the BSI feedback may be the BSI. At this time, the BSI request may be immediately transmitted to the first UE 200-1 by the determination of the BS 100 through a control channel, and may be transmitted using a currently served serving beam. The BRS may also be referred to as a beamformed reference signal. For example, the control channel may be a Physical Downlink Control Channel (PDCCH).

The BS 100 may receive BSI feedback for the Beam Reference Signal. At this time, the Beam Reference Signal may be a signal defined to measure a separate beam quality according to an applicable standard, or may be a synchronization (synch) signal defined for beam operation. For example, the synchronization signal may be a Primary Synchronization Signal (PSS) or a Secondary Synchronization Signal (SSS) of an LTE system or a Synchronization Signal Block (SSB) of a 5G New Radio (NR) system.

The BS 100 may determine optimal beams on the basis of the BSI feedback received from the first UE 200-1. The optimal beams may be a beam pair (that is, a BS beam and a UE beam, or a transmission beam and a reception beam) having the best signal quality (for example, RSRP) or a beam pair of the serving BS and the UE at a particular time point, and may be expressed as serving beams or best beams unless specifically described otherwise. When a beam on the transmitting side and a beam on the receiving side exist, the pair of the beam on the transmitting side and the beam on the receiving side may be referred to as a beam pair.

The BS 100 may change the serving beams to the determined serving beams and may transmit a Beam Change Indication (BCI) for changing the serving beams to the first UE 200-1.

The BS 100 may determine whether the first UE 200-1 is a terminal that requires a recovery operation. Specifically, when the channel condition of the first UE 200-1 is not good (e.g., determined to be less than a predetermined threshold or condition value) or when the first UE 200-1 is a UE having information on beams received through BSI feedback, the information being highly likely to have an error, the BS 100 may determine that the first UE 200-1 is a UE that requires a recovery operation.

The BS 100 may manage a plurality of beams that serve the first UE 200-1. For example, the BS 100 may store information on the existing serving beams even though the serving beams of the first UE 200-1 are changed.

When the serving beams that serve the UE requiring the recovery operation are changed, the BS 100 may determine beams for the recovery operation on the basis of information on the existing serving beams. When beams for the recovery operation are determined, the BS 100 may transmit a control channel to the first UE 200-1 using the beams for the recovery operation. Meanwhile, it is understood that using the serving beams as the beams for the recovery operation is only an example, and one or more other embodiments are not limited thereto. For example, the control channel may be a PDCCH.

The first UE 200-1 communicates with the BS 100 through a beamforming antenna.

Specifically, the first UE 200-1 may receive a Beam Reference Signal from the BS 100. When receiving the Beam Reference Signal, the first UE 200-1 may recognize that the Beam Reference Signal is a reference signal corresponding to a beam ID of which both the BS and the UE are capable of being aware according to the explicit/implicit rule, so that the first UE 200-1 may measure an index of the corresponding beam and Reference Signal Received Power (RSRP), which is a received signal level of the beam. At this time, in addition to RSRP, any value corresponding to channel quality information that can be measured may be defined in the standard. Hereinafter, the case in which the BSI includes the beam index and the beam RSRP will be described by way of example.

The first UE 200-1 may receive a BSI request that makes a request for BSI from the BS 100. When receiving the BSI request, the first UE 200-1 may transmit BSI feedback for the Beam Reference Signal to the BS 100. The first UE 200-1 may feed information back on beams having the best quality from among beams that the first UE 200-1 measures, or may feed a plurality of beams back.

The first UE 200-1 may receive a beam change indication from the BS 100. Upon successfully receiving the beam change indication, the first UE 200-1 may transmit Acknowledgement (ACK) to the BS 100 and then change serving beams for communication with the BS 100 after a predetermined time, which may be predetermined or defined by an applicable standard, from the ACK transmission.

When the first UE 200-1 is a UE that requires the recovery operation, the first UE 200-1 may receive a control channel for the recovery operation from the BS 100. Since the first UE 200-1 receives the control channel for the recovery operation, if the beam change is wrong, the beams can be recovered to the existing beams.

Figure 2:
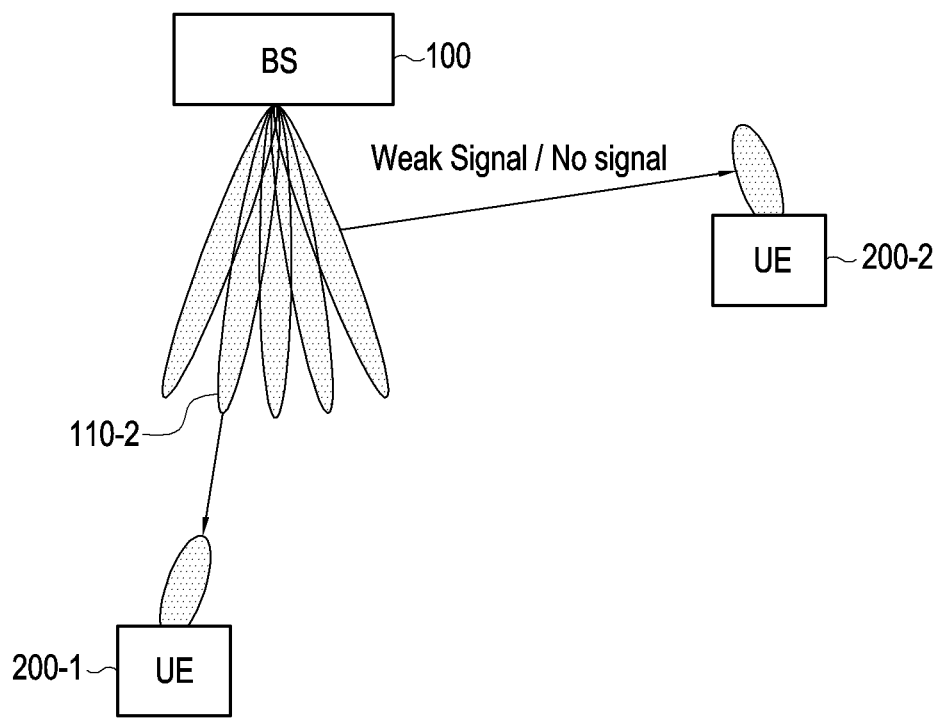
FIGS. 2 and 3 illustrate a case in which a UE escapes a beam coverage area according to one or more embodiments.
Figure 3:
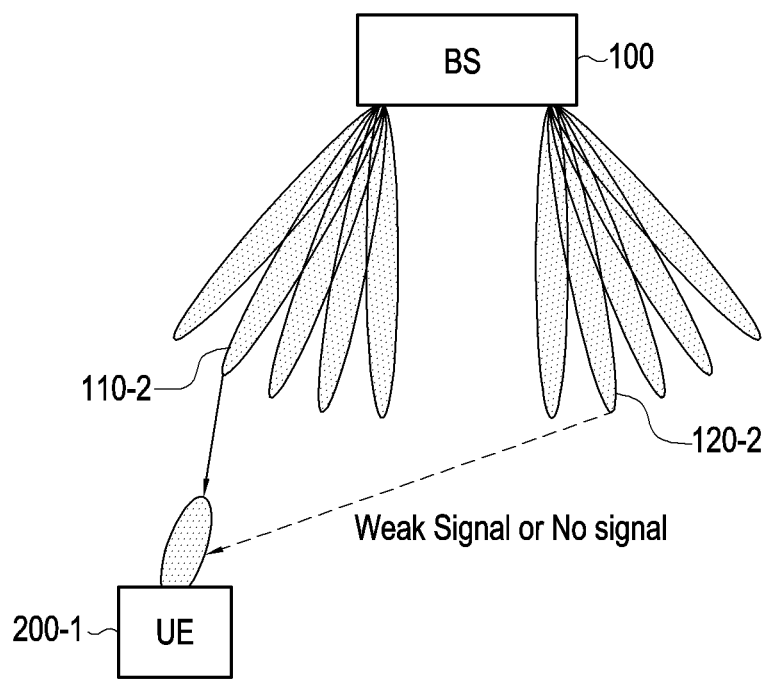

The reason why the beam change is determined is described in detail below with reference to FIGS. 2 and 3. FIGS. 2 and 3 illustrate the BS 100, the first UE 200-1, and the second UE 200-2 in a mmWave communication system to which beamforming is applied according to one or more embodiments.

As illustrated in FIG. 2, the BS 100 may transmit and receive data to and from the first UE 200-1 and the second UE 200-2 through a plurality of beamforming actions. In order to compensate for high path loss in the mmWave band, beamforming achieves high antenna gain in the 5G system, so that transmission and reception can be performed with a predetermined quality or higher only in a narrow coverage area. For example, the BS 100 may transmit and receive data to and from the first UE 200-1 with a predetermined quality or higher through a beam 110-2, but the signal transmitted to and received from the second UE 200-2 may be weak, or transmission and reception itself may be impossible. At this time, the number of beams can be determined as a predetermined number, and the BS 100 may use only one beam in the same time resource (for example, subframe or TTI).

FIG. 3 illustrates an embodiment in which the BS 100 uses a plurality of beam groups. As illustrated in FIG. 3, the BS 100 may transmit and receive data to and from the first UE 200-1 with a predetermined quality or higher through a beam 110-2 included in a first group heading for a direction in which the first UE 200-1 is located. However, when a beam 120-2 included in a second group heading for a direction different from the direction in which the first UE 200-1 is located is used, a signal transmitted and received between the BS 100 and the first UE 200-1 may be weak, or transmission and reception itself may be impossible.

Since a coverage area of communication using beamforming in the 5G system is narrow, the BS 100 has limitations in that all signals should be transmitted using the beam corresponding to the first UE 200-1. Accordingly, the BS 100 and the first UE 200-1 determine beams suitable for data transmission and reception, and an operation for maintaining optimal beams is implemented.

Figure 4:
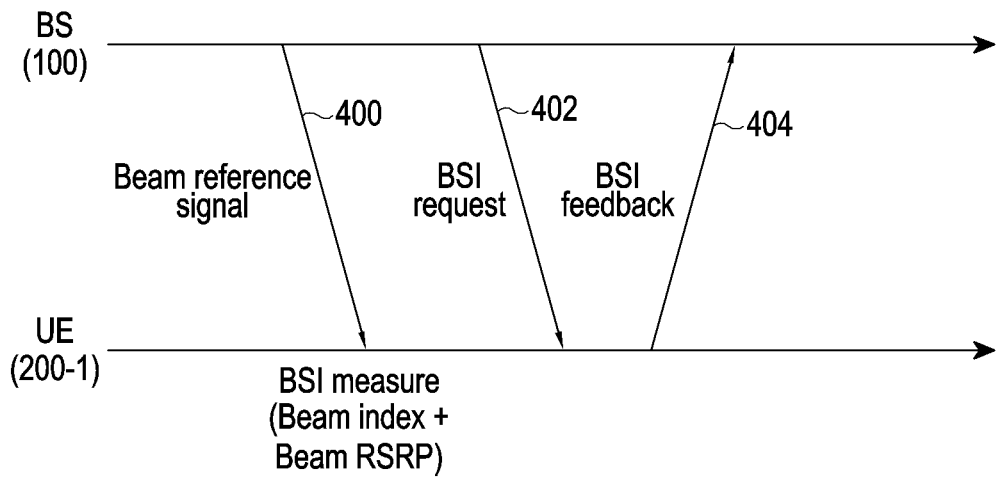

A beam change processor according to one or more embodiments is described below with reference to FIGS. 4 and 5. FIG. 4 illustrates beam status measurement and beam status feedback according to an embodiment.

First, the BS 100 may periodically or aperiodically transmit a Beam Reference Signal to the first UE 200-1. At this time, the Beam Reference Signal may be a signal for measuring a beam channel quality separately defined according to an applicable standard or a synchronization signal defined for beam operation (although one or more other embodiments may not be limited thereto).

When receiving the Beam Reference Signal, the first UE 200-1 may measure the beam status. Specifically, the first UE 200-1 may measure a beam index and RSRP, which is a received beam signal level. In addition to the RSRP, any value of channel quality information that can be measured can be obtained by the first UE 2001 (e.g., according to an applicable standard). In the following description, the beam index and the beam RSRP together are referred to as BSI, though it is understood that one or more other embodiments are not limited thereto and additional or different channel quality information may be the BSI.

The BS 100 may periodically or aperiodically transmit a BSI request that makes a request for BSI feedback (that is, BSI) to the first UE 200-1 as indicated by reference numeral 402. The BS 100 may transmit the BSI request through a Media Access Control (MAC) Control Element (CE) and/or transmit the BSI request through a control channel for immediate transmission and transmit the control channel using a currently served serving beam.

When receiving the BSI request from the BS 100, the first UE 200-1 may transmit BSI feedback to the BS 100, as indicated by reference numeral 404. Specifically, the first UE 200-1 may feed back information on the beam having the best quality from among beams that the first UE 200-1 measures according to the 5G standard (or an applicable communication standard or implementation). Further, the first UE 200-1 may feed back a plurality of high quality beams (e.g., information on a plurality of beams having a quality determined to be greater than a predetermined threshold or metric).

The BS 100 may manage the corresponding beams (that is, beams indicated by the BSI) on the basis of the BSI feedback received from the first UE 200-1 and change the current serving beams. FIG. 5 illustrates a beam change process according to an embodiment.

First, the BS 100 may determine a beam change (i.e., determine to change one or more current serving beams). Specifically, the BS 100 may determine whether to change the beams on the basis of beam state information (BSI) of the beams included in the received BSI feedback 500. When changing the beams is determined, the BS 100 may transmit a Beam Change Indication (BCI) for indicating the beam change to the first UE 200-1, as indicated by reference numeral 502. At this time, the beam change indication means a notification indicating a change from the current beam to a new beam, and may include information for indicating or identifying the new beam, e.g., a beam ID included in the most recent BSI feedback or a new beam ID through a separately allocated bit.

When receiving the beam change indication, the first UE 200-1 may transmit ACK, which indicates the successful reception of the beam change indication, to the BS 100, as indicated by reference numeral 504.

The BS 100 and the first UE 200-1 may change the serving beams to the new beams after a preset time 506 (for example, 11 TTIs or 14 TTIs) from the time point at which the BS 100 receives ACK.

Figure 5:
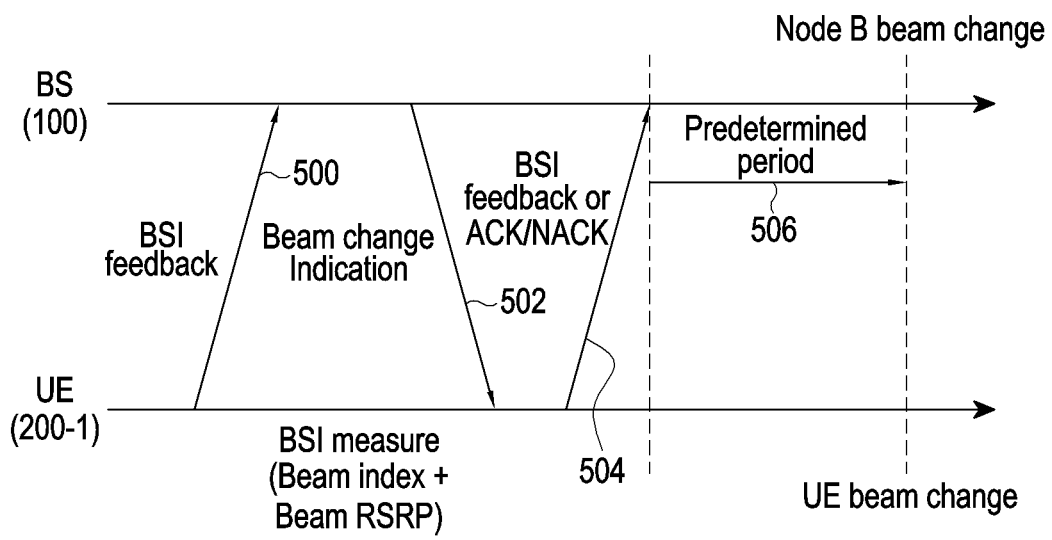

Although FIG. 5 illustrates that the BS 100 determines new beams and indicates the change to the new beams, it is understood that one or more other embodiments are not limited thereto. For example, the beam change indication that the BS 100 transmits to the first UE 200-1 may include the BSI request. When receiving the beam change indication, the first UE 200-1 may transmit BSI feedback including a beam ID. The BS 100 and the first UE 200-1 may change beams of the beam ID included in the beam change indication to serving beams. By way of non-limiting example, in order to transmit the beam change indication according to the 5G Task Force (TF) standard, the BS 100 may transmit the beam change indication through Downlink Control Information (DCI) of a PDCCH or through a MAC CE. When the beam change indication is transmitted through the DCI of the PDCCH, the BS 100 may simultaneously transmit the BSI request and the beam change indication and may change the beams to the beam ID included in BSI feedback. When the beam change indication is transmitted through the MAC CE, the BS 100 may explicitly or specifically designate a beam ID from among beam IDs included in the received existing feedback through the MAC CE and transmit the beam ID to the first UE 200-1. Further, the BS 100 may switch transmission of the beam change indication through the DCI of the PDCCH and transmission of the beam change indication through the MAC CE depending on the circumstances. Robustness against errors may be achieved by switching of the transmission types of the beam change indication in an environment in which there is a possibility of errors in the beam change.

Specifically, when the beam change indication is transmitted through the DCI of the PDCCH and a beam recovery operation is performed, the BS 100 may transmit the beam change indication through the MAC CE in order to perform the beam change. Alternatively, when the beam change indication is transmitted through the MAC CE and a beam recovery operation is performed, the BS 100 may transmit the beam change indication through the DCI of the PDCCH in order to perform the beam change.

Transmission of the downlink control channel is performed using the beams determined by the BS 100, and the number of antennas used for the transmission may be defined in each standard. For example, since the PDCCH is an important control channel signal, a transmission scheme for simple and rapid decoding is applied; therefore, a Space Frequency Block Coding (SFBC) transmission scheme may be supported in LTE and 5G standards. Further, a transmission scheme of the PDCCH may include a one-port transmit diversity scheme and polar coding on the basis of 3GPP NR.

FIGS. 6A to 6C and 7A to 7C illustrate a beam change operation according to one or more embodiments. According to an embodiment, the BS 100 may transmit and receive data to and from the first UE 200-1 through current serving beams 110-5, as illustrated in FIG. 6A.

As illustrated in FIG. 6B, the BS 100 may transmit reference signals of beams 120-1 of beam group #1 to the first UE 200-1. When receiving the reference signals of the beams 120-1, the first UE 200-1 may measure BSI. It is assumed that RSRP of the beams 120-1 of beam group #1 is larger than RSRP of the current serving beams 110-5. In the state in which a fourth beam 110-5 of beam group #0 is the serving beam, the first UE 200-1 may detect that the beams 120-1 of beam group #1 have better reception quality.

As illustrated in FIG. 6C, the BS 100 may transmit a BSI request to the first UE 200-1 through a control channel, as indicated by reference numeral 600. When receiving the BSI request, the first UE 200-1 may transmit BSI feedback including a beam ID of a fifth beam 120-1 of beam group #1 to the BS 100, as indicated by reference numeral 602.

As illustrated in FIG. 7A, the BS 100 may determine to perform a change to the fifth beam 120-1 of beam group #1 on the basis of the BSI feedback. For the beam change to the new beam 120-1, the BS 100 may transmit a beam change indication to the first UE 200-1 through the fourth beam 110-5 of beam group #0, as indicated by reference numeral 700.

As illustrated in FIG. 7B, the first UE 200-1 may transmit ACK indicating successful reception of the beam change indication while transmitting the BSI feedback to the BS 100 again, as indicated by reference numeral 702.

As illustrated in FIG. 7C, when a preset time passes after the BS 100 receives ACK, the BS 100 and the first UE 200-1 may perform the beam change to the beam 120-1 of beam group #1 and transmit and receive data through the fifth beam 120-1 of beam group #1 as indicated by reference numeral 704.

As described above, the BS 100 may change the beam group for transmitting data or control information. Accordingly, the beam group can be successfully and effectively switched, thereby achieving optimized coverage for successful transmission and reception according to the location of the UE even when coverage is different for each of a plurality of beam groups.

Unlike the beam change operation described in FIGS. 6A to 6C and FIGS. 7A to 7C, there may be various restrictions in an actual wireless communication situation, so that there is the possibility of occurrence of errors in the beam change.

According to an embodiment, in a method by which the BS 100 explicitly determines and designates the beam ID and transmits the beam change indication, the beam ID included in feedback received from the first UE 200-1 may be incorrectly decoded by the BS 100 (or incorrectly encoded or transmitted by the first UE 200-1). In this case, the BS 100 may analyze or determine a beam ID different from the information that the first UE 200-1 desires to transmit, and thus errors in the beam change may occur. Alternatively, although the BS 100 transmits the correct beam ID to the first UE 200-1 through the MAC CE, the first UE 200-1 incorrectly decodes the beam ID and thus errors in the beam change may occur.

According to another embodiment, in a method by which the BS 100 transmits both the BSI request and the beam change indication and the first UE 200-1 transmits BSI feedback including the beam ID, if the BS 100 incorrectly decodes the beam ID included in the BSI feedback or when BSI measurement of the first UE 200-1 is incorrectly performed, errors in the beam change may occur.

As described above, when there are errors in the beam change, transmission and/or reception performance may deteriorate, or communication may become impossible due to the incorrect beam change. When communication becomes impossible, the BS 100 and the first UE 200-1 lose connectivity, and the first UE 200-1 may again perform Radio Resource Reestablishment (RRE), enter an idle state, or may again perform a cell search, so that communication may be disconnected for a predetermined time (for example, scores of msec). The RRE is a main factor causing performance deterioration, and it may be used as an index of system performance.

FIGS. 8A to 8C and FIGS. 9A to 9C illustrate a case in which a beam change is incorrectly performed according to one or more embodiments.

FIGS. 8A to 8C illustrate a case in which the beam change is incorrectly performed between a BS 100 operating only one beam group and a UE 200-1 according to an embodiment.

Specifically, as illustrated in FIG. 8A, the BS 100 may transmit a beam change indication and a BSI request to the first UE 200-1 through a zeroth beam 110-1, as indicated by reference numeral 800.

As illustrated in FIG. 8B, the first UE 200-1 may transmit BSI feedback including beam ID #1 through the zeroth beam 110-1 as indicated by reference numeral 802. The the BS 100 receiving the BSI feedback may incorrectly decode the BSI feedback, for example, the beam ID included in the BSI feedback may be incorrectly analyzed as beam ID #4. Since the BS 100 incorrectly analyzed the beam ID, the first UE 200-1 cannot receive a control channel even though the control channel is transmitted through a fourth beam 110-5, as indicated by reference numeral 804 in FIG. 8C.

Figures 9A, 9B, 9C:
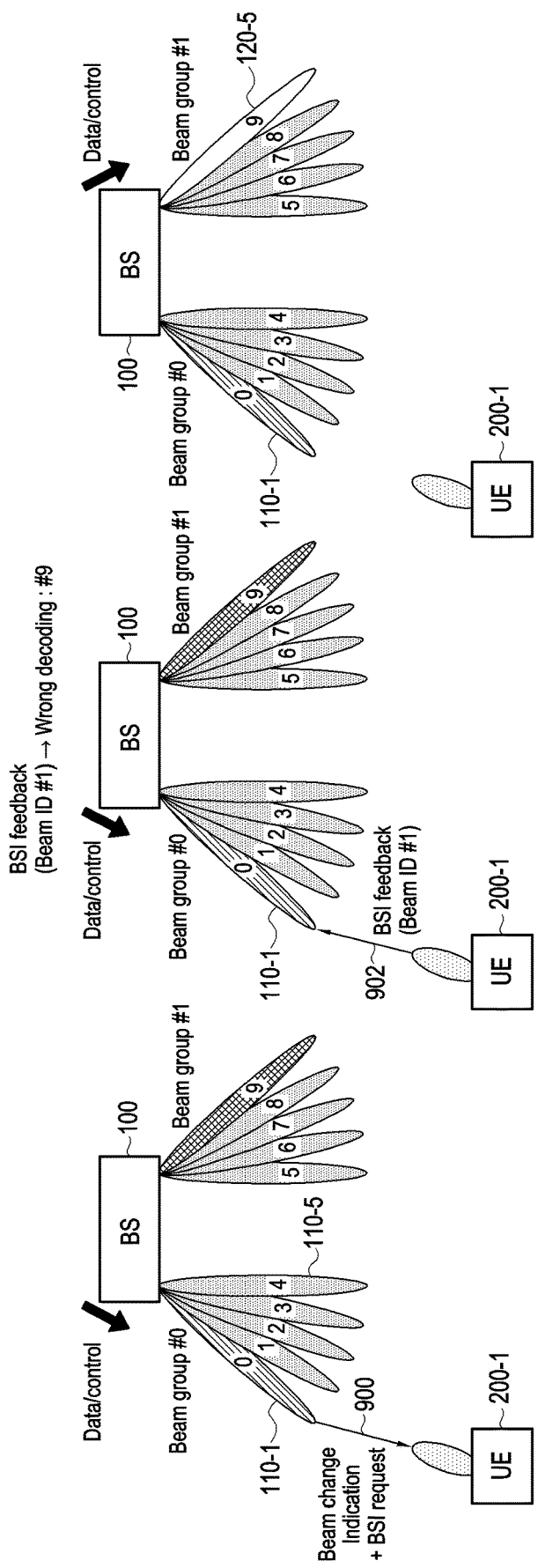

FIGS. 9A to 9C illustrate a case in which a beam change is incorrectly performed between a BS 100 operating a plurality of beam groups and a UE 200-1 according to an embodiment.

Specifically, as illustrated in FIG. 9A, the BS 100 may transmit a beam change indication and a BSI request to the first UE 200-1 through a zeroth beam 110-1 of beam group #0, as indicated by reference numeral 900.

As illustrated in FIG. 9B, the first UE 200-1 may transmit BSI feedback including beam ID #1 through the zeroth beam 110-1 of beam group #1, as indicated by reference numeral 902. The BS 100 receiving the BSI feedback may incorrectly decode the BSI feedback, for example, the beam ID included in the BSI feedback may be incorrectly analyzed as beam ID #9. Since the BS 100 incorrectly analyzed the beam ID, the first UE 200-1 cannot receive data or a control channel even though the data or the control channel is transmitted through a ninth beam 120-5 of beam group #1, as illustrated in FIG. 9C.

As described above, the incorrect beam change in the beamforming-based system, which may occur in an actual communication situation, may disconnect communication of the UE or may make recovering the connection of the UE impossible or time-consuming. Below, a method of transmitting a control channel to solve the above-described problem that may occur due to the incorrect beam change in the beamforming-based system according to one or more embodiments is described with reference to FIGS. 10 to 14.

Figure 10:
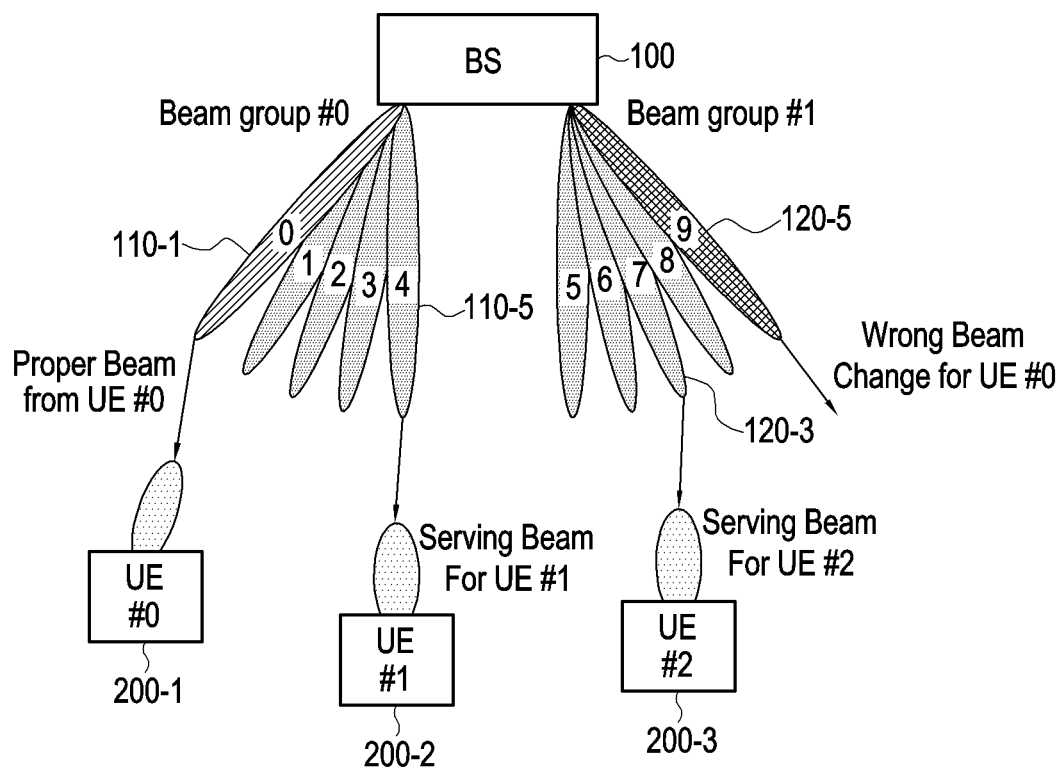

FIG. 10 illustrates a case in which a beam recovery operation is incorrectly performed according to an embodiment. In FIG. 10, it is assumed that the beam change is incorrectly performed on the basis of incorrect BSI feedback of the first UE 200-1, and that the second UE 200-2 uses the fourth beam 110-5 of beam group #0.

As illustrated in FIG. 10, a serving beam corresponding to the first UE 200-1 is the zeroth beam 110-1 of beam group #0, but the BS 100 may transmit a control channel or data for the first UE 200-1 through the ninth beam 120-5 of beam group #1. However, the first UE 200-1 cannot receive the control channel or the data transmitted by the BS 100 through the ninth beam 120-5 of beam group #1. The second UE 200-2 may perform normal communication through the fourth beam 110-5 of beam group #0.

As described above, when the BS 100 transmits data only through the beam through which the UE cannot transmit and receive the data due to the incorrect beam change, communication between the BS and the UE may be disconnected.

In order to prevent this situation, a method according to an embodiment transmits, after the beam change, a control channel (for example, a PDCCH) not only through a new beam, but also through another beam.

Since the beam is generally changed to the optimal beam, managing the changed new beam and the other beam and transmitting a control signal through the other beam may, however, correspond to overhead from the aspect of performance. In order to minimize the overhead, the BS 100 may determine if the corresponding UE requires the recovery operation or determine which beam will be used for performing the recovery operation.

The BS 100 may determine what will be transmitted through the existing serving beam for the recovery operation. Specifically, in the case of a UE that has no data transmission but should maintain connectivity, the operation through data transmission, such as a Physical Downlink Shared Channel (PDSCH) or a Physical Uplink Shared Channel (PUSCH), may not maintain sufficient connectivity. Accordingly, the BS 100 may transmit various control signals and thus allow the UE to perform an operation such as beam feedback, and the operation may be performed by the determination of the BS 100 even though there is no data; therefore, it may be preferable to transmit the control channel (for example, the PDCCH). Data transmission may cause unintended interference, and thus it may be not preferable to allocate data. In this specification, transmission of a control channel is basically described, and a PDCCH may be transmitted according to an embodiment.

Figure 11:
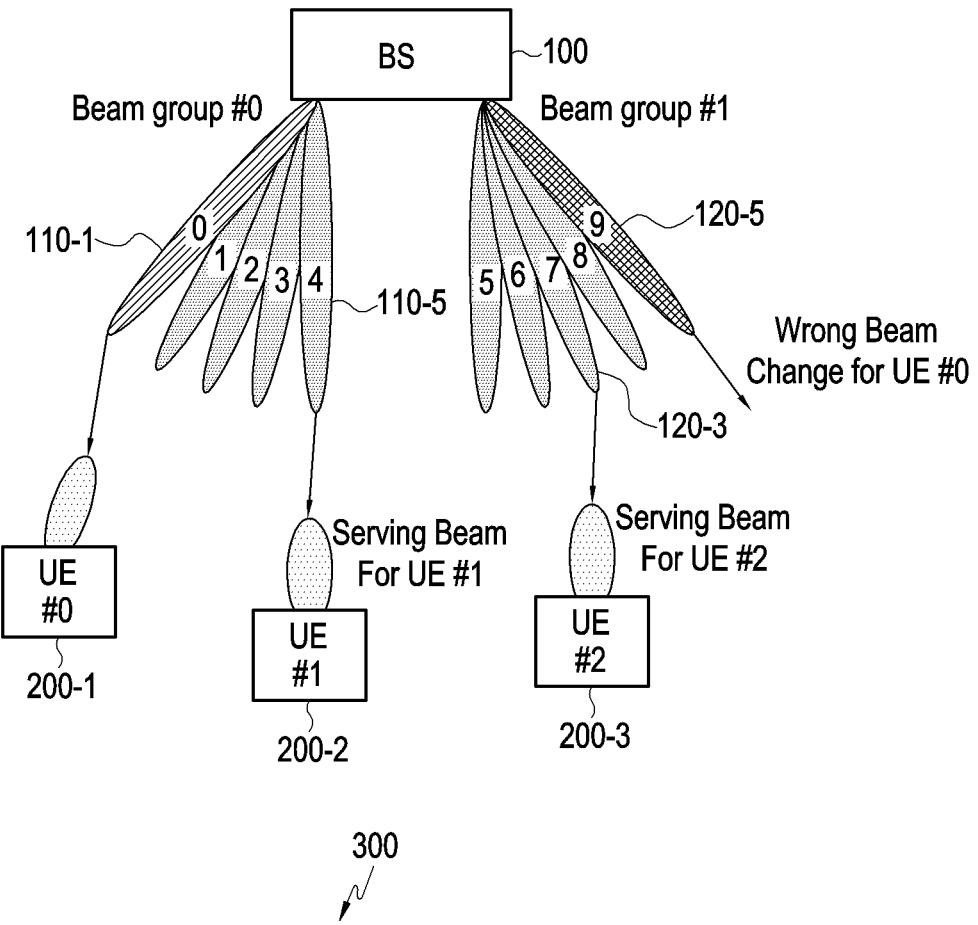
FIG. 11 illustrates a beam recovery operation according to an embodiment.

FIG. 11 illustrates a method of performing a beam recovery operation according to an embodiment.

The BS 100 may determine whether the first UE 200-1 is a UE that requires a recovery operation. For example, when there is a high possibility of incorrect beam information received through BSI feedback due to a bad channel condition of a particular UE, the BS 100 may determine that the particular UE is a UE that requires the recovery operation. The beam recovery operation in which the BS 100 and the first UE 200-1 transmit a control channel (for example, a PDCCH) through any of the existing serving beams after changing the beam may be overhead from the perspective of performance. Transmission only through a new beam and transmission to another UE through a beam other than the new beam are advantageous in terms of efficiency. Accordingly, performing the beam recovery operation with respect to all UEs may waste resources, and thus a process of determining whether a particular UE is a UE that requires the beam recovery operation may be further performed.

Specifically, when predetermined feedback from a current serving beam with a threshold value (e.g, P_erasure_threshold %) or higher from the currently serving beam is not received for a particular recent time (e.g., T_reliability_p-eriod) or when predetermined feedback with a threshold value (e.g., N_erasure_threshold) or higher is not received for a particular recent time (e.g., T_reliability_period), the BS 100 may determine that the particular UE is a UE requiring a recovery operation. When P_erasure_threshold or N_erasure_threshold is configured as 0, the BS 100 may determine that all UEs are targets of the beam recovery operation. At this time, non-reception of predetermined feedback may mean that none of the pieces of data or control information determined to be transmitted from the UE through an uplink (UL) or downlink (DL) allocation are received by the BS 100 through allocated time/frequency resources.

Alternatively, when reception performance (for example, a Signal-to-Interference-and-Noise Ratio (SINR)) of a particular UE or a Channel State Information (CSI) value of the UE is equal to or smaller than a threshold value for a particular recent time (e.g., T_reliability_period), the BS 100 may determine that the particular UE is a target of the recovery operation. The reception performance or the CSI value of the UE may be acquired on the basis of uplink reception performance or CSI information fed back from the UE. For example, when the threshold value is configured to be limitless, the BS 100 may determine that all UEs are targets of the beam recovery operation.

When a plurality of beam groups covers physically different spatial areas and a UE belonging to a particular beam group feeds back a beam of another beam group as a beam having good reception performance, the BS may determine that the UE is located in an edge area of the particular beam group (having bad reception performance). Accordingly, when the UE feeds back an index and an RSRP value of the beam of the beam group different from the beam group to which the UE belongs, the BS may determine that the UE is a target of the beam recovery operation regardless of the above determination condition.

When a particular UE is determined as the target for the beam recovery operation, the BS 100 may transmit data through a control channel by additionally allocating resources (for example, beam or time resources) to the particular UE in order to maintain connectivity even after the beam change. An example of the data transmitted through the additionally allocated resources may be a BSI request transmitted through a PDCCH. At this time, the beam used by the BS 100 to transmit the control channel in order to maintain connectivity (that is, recover the beam) may be determined through the following method. Hereinafter, a control channel additionally transmitted even after the beam change may be referred to as "a control channel for beam recovery," "a control channel for maintaining connectivity," "a PDCCH for beam recovery," and "a PDCCH for maintaining connectivity".

When the first UE 200-1 changes the serving beam, it is based upon the premise that the serving beam to be changed has better reception performance than the current beam, so the storage of information on the existing serving beam by the BS 100 may be a kind of overhead. However, in order to reduce the possibility of escaping the beam coverage due to the incorrect beam change, the BS 100 stores (e.g., is required to store) information on the exiting serving beam. Accordingly, the BS 100 may determine a beam used for transmitting a control channel for beam recovery through a method according to the following embodiment after the beam change.

First, the BS 100 may store a preset number of the latest serving beams.

The BS 100 may store a predetermined number (e.g., N_pre_beam) of beams for a preset time (e.g., T_pre_beam), and when the preset time expires, delete information on the corresponding beams. At this time, when the preset time is limitless, the BS 100 may be configured to continuously store information on the predetermined number (e.g., N_pre_beam) of beams.

The BS 100 may determine that the beam having the best RSRP or the latest beam for a recently preset time (e.g., T_beam_select) from among the predetermined number (e.g., N_pre_beam) of beams is the beam for transmitting the control channel. Alternatively, the BS 100 may determine that a beam determined according to a scheduling result or scheme rather than the existing beam is the beam for transmitting the control channel. This may be a method of opportunistically increasing a reception probability by increasing the number of transmissions rather than improving performance.

Even though the first UE 200-1 is a UE that is a target for the recovery operation and it is determined that the fourth beam 110-5 of beam group #0 is the beam for transmitting the control channel for the recovery operation, the BS 100 may determine resources for transmitting the control channel since there are other UEs 200-2 and 200-3 communicating with the BS 100. At this time, resources for transmitting the control channel may be, for example, actual hardware such as an antenna, TTIs, and/or frequency resources. Further, a determination of how many times the control channel for the recovery operation should be transmitted may be required. Accordingly, scheduling for the beam recovery operation according to an embodiment is described below. Hereinafter, in the description of scheduling, the control channel may be a PDCCH, but is not limited thereto in one or more other embodiments.

In the present embodiment, it is assumed that the priority of the recovery operation does not precede the established selection priority of UEs due to the scheduling result. This assumption is to prevent interruption of data transmission of other UEs due to recovery by the UE performing the incorrect beam change. However, when "active transmission of a control channel" is configured, the control channel is transmitted only through securing frequency resources for transmitting the control channel without considering the suitability of resources or beams when the control channel for beam recovery is transmitted, so the reception probability may be opportunistically increased. Time resources for transmitting the control channel or data are referred to as subframes, and the term "subframes" hereinafter refers only to subframes for transmitting a BSI request, rather than all subframes. The BS 100 may determine the subframe periodically or aperiodically.

First, the BS 100 may perform scheduling of UEs for respective beam groups. At this time, a scheduling metric may be a scheduling metric broadly used in a communication system or some other scheduling metric.

When beam group scheduling ends, the BS 100 may operate according to each case below.

One or more embodiments of the beam recovery operation (e.g., as illustrated in FIG. 11) will be described in more detail with reference to FIGS. 12 to 14 and 15A to 15B. FIGS. 12 to 14 and 15A to 15B are flowcharts illustrating scheduling for the beam recovery operation according to one or more embodiments.

Figure 12:
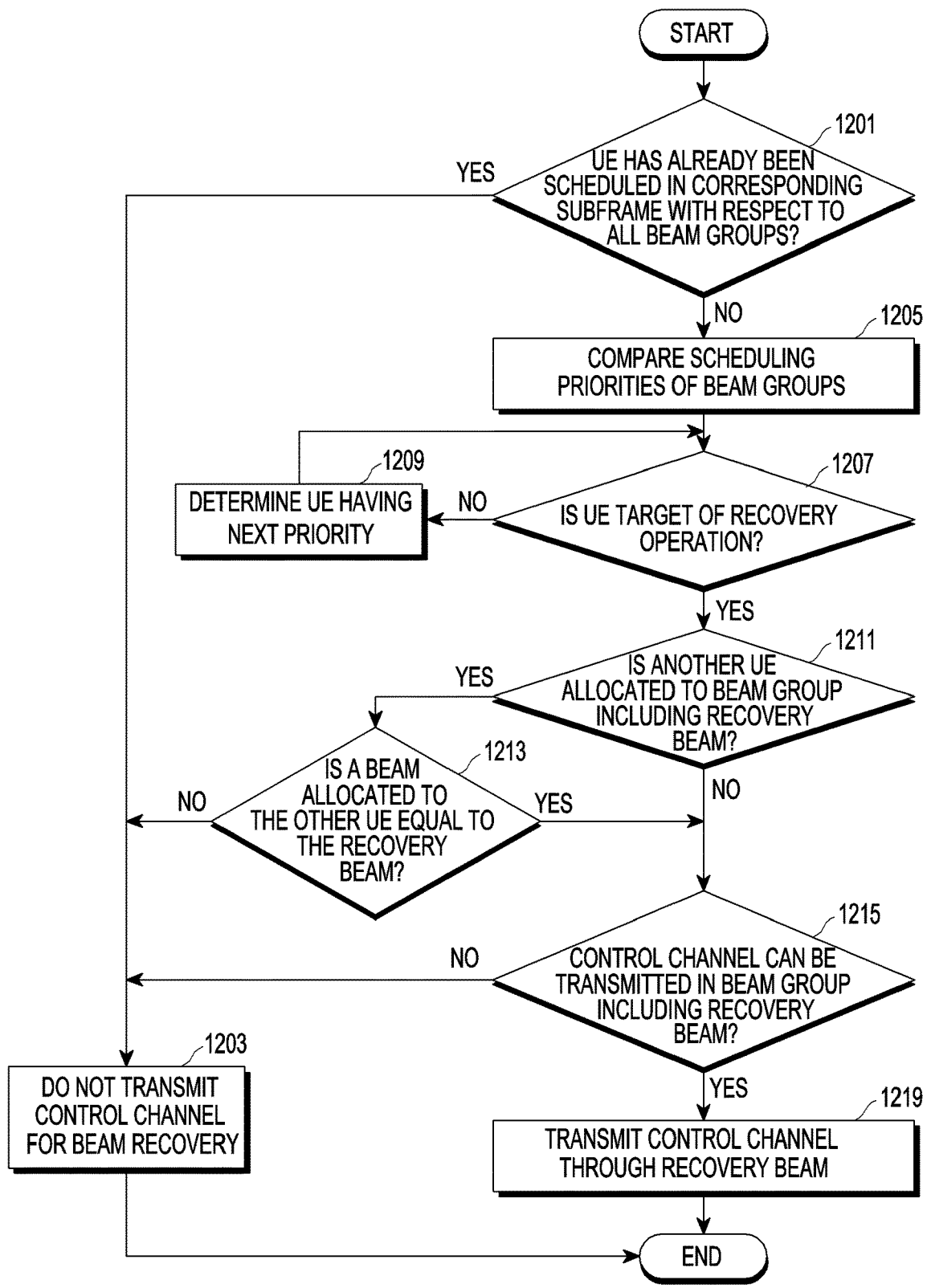
FIGS. 12 to 14 and 15A to 15B are flowcharts illustrating a scheduling method for a beam recovery operation according to one or more embodiments.

FIG. 12 is a flowchart illustrating a scheduling method of the BS 100 for the beam recovery operation when the number of beam groups operated by the BS is plural and "active transmission of a control channel" is not applied (that is, is off).

In operation 1201, the BS 100 may determine whether UEs are scheduled to the corresponding subframe with respect to all beam groups.

In operation 1203, when the UEs are scheduled to the corresponding subframe with respect to all beam groups, the BS 100 may not transmit a control channel for beam recovery.

When there is a beam group in which UEs are not scheduled to the corresponding subframe, the BS 100 may compare scheduling priorities of beam groups in operation 1205. The number of beam groups allocated to the UE is plural, and the BS 100 may compare metrics of the UE allocated to the plurality of beam groups and determine priorities of the beam groups. When the priorities are the same, the UE may randomly select one beam group.

In operation 1207, the BS 100 may determine whether the UEs are targets for the recovery operation sequentially from the UE having the highest priority on the basis of the priorities of the UEs. When the UE having the corresponding priority is not the UE for the beam recovery operation, the BS 100 may determine whether the UE having the next priority is the UE for the beam recovery operation in process 1209. When the UE is not the target for the recovery operation, the BS 100 may allocate resources to the corresponding UE in the beam group to which the UE belongs and determine the UE having the next priority.

When the corresponding UE is the UE for the beam recovery operation, the BS 100 may determine whether another UE belongs to the beam group including the recovery beam in operation 1211.

When another UE belongs to the beam group including the recovery beam, the BS 100 may not transmit a control channel for beam recovery in operation 1203.

When another UE belongs to the beam group including the recovery beam, the BS may determine whether the beam to which the other UE is allocated is the same as the beam for the beam recovery of the UE in operation 1213.

When the beam to which the other UE is allocated is not the same as the beam for the beam recovery of the UE, the BS 100 may not transmit the control channel for the beam recovery in operation 1203.

When the beam to which the other UE is allocated is the same as the beam for the beam recovery of the UE, the BS 100 may determine whether the beam group including the recovery beam can transmit the control channel to the corresponding UE in operation 1215.

When another UE is not allocated to the beam group including the recovery beam, the BS 100 may determine whether the beam group including the recovery beam can transmit the control channel to the corresponding UE in operation 1215.

When the beam group including the recovery beam cannot transmit the control channel to the corresponding UE, the BS 100 may not transmit the control channel for the beam recovery in operation 1203.

When the beam group including the recovery beam can transmit the control channel to the corresponding UE, the BS 100 may transmit the control channel to the corresponding UE through the recovery beam in operation 1219.

At this time, an example of the control channel may be a BSI request for a beam feedback request. Accordingly, to the same subject, the same control channel may be transmitted in both the beam group including a new beam and the beam group of which transmission is determined in operation 1219.

Figure 13:
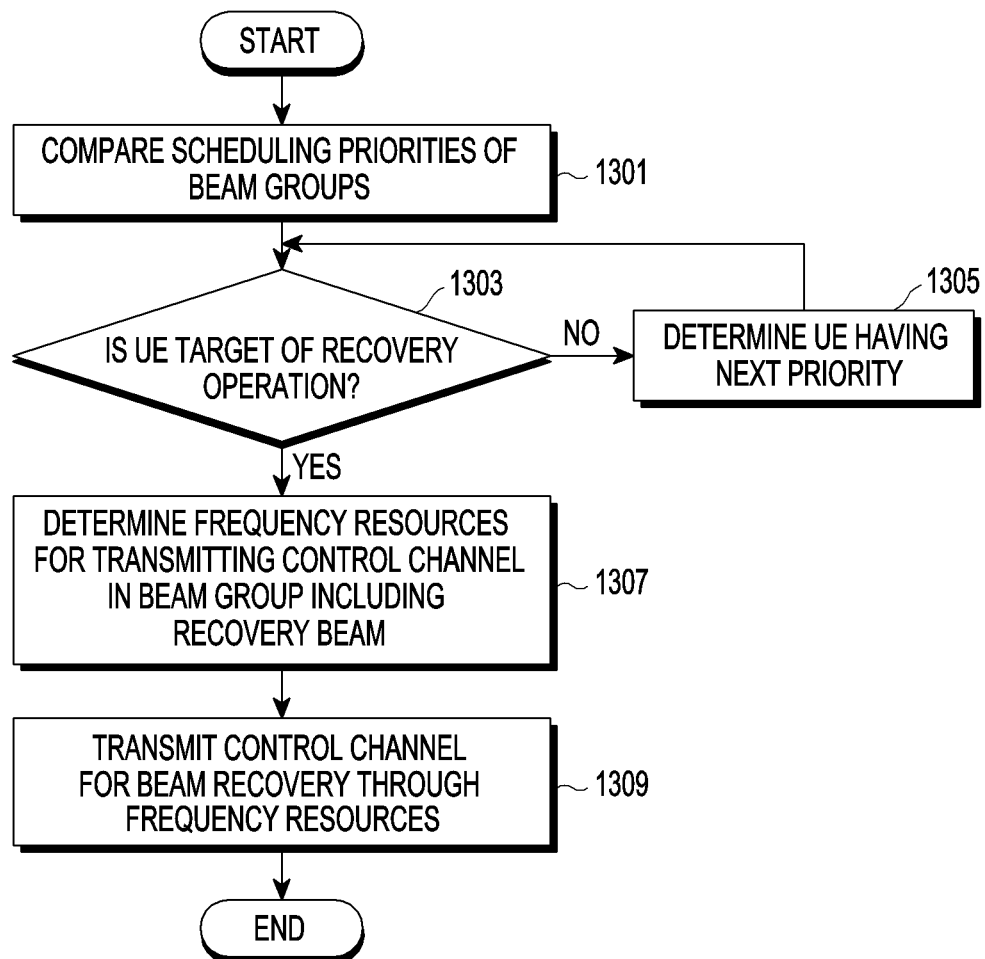

FIG. 13 is a flowchart illustrating a scheduling method of the BS 100 for the beam recovery operation when the number of beam groups operated by the BS is plural and "active transmission of a control channel" is applied (that is, is on).

Since active transmission of the control channel is applied, the BS 100 may transmit the control channel as follows even though UEs have already been scheduled to the corresponding subframe with respect to all beam groups.

In operation 1301, the BS 100 may compare scheduling priorities of beam groups. When the number of beam groups allocated to the UE is plural, the BS 100 may compare metrics of the UE allocated to the plurality of beam groups and determine the priorities of the beam groups. When the priorities are the same, the BS may randomly select one beam group.

In operation 1303, the BS 100 may determine whether the UEs are targets for the beam recovery operation sequentially from the UE having the highest priority on the basis of the priorities of the UEs.

When the UE having the corresponding priority is not the UE for the beam recovery operation, the BS 100 may allocate resources to the corresponding UE and determine whether the UE having the next priority is the UE for the beam recovery operation operation 1305.

When the corresponding UE is the UE for the recovery operation, the BS 100 may determine frequency resources for transmitting the control channel in the beam group including the recovery beam in operation 1307.

In operation 1309, the BS 100 may transmit a control channel for recovery through the determined frequency resources. At this time, the BS 100 may transmit the control channel through the remaining frequency resources even though the beam for transmitting the control channel is a beam used for transmission to another UE (that is, regardless of the beam). At this time, an example of the control channel may be a BSI request for a beam feedback request. Accordingly, to the same subframe, the same control channel may be transmitted in both the beam group including a new beam and the beam group of which transmission is determined in operation 1307.

Figure 14:
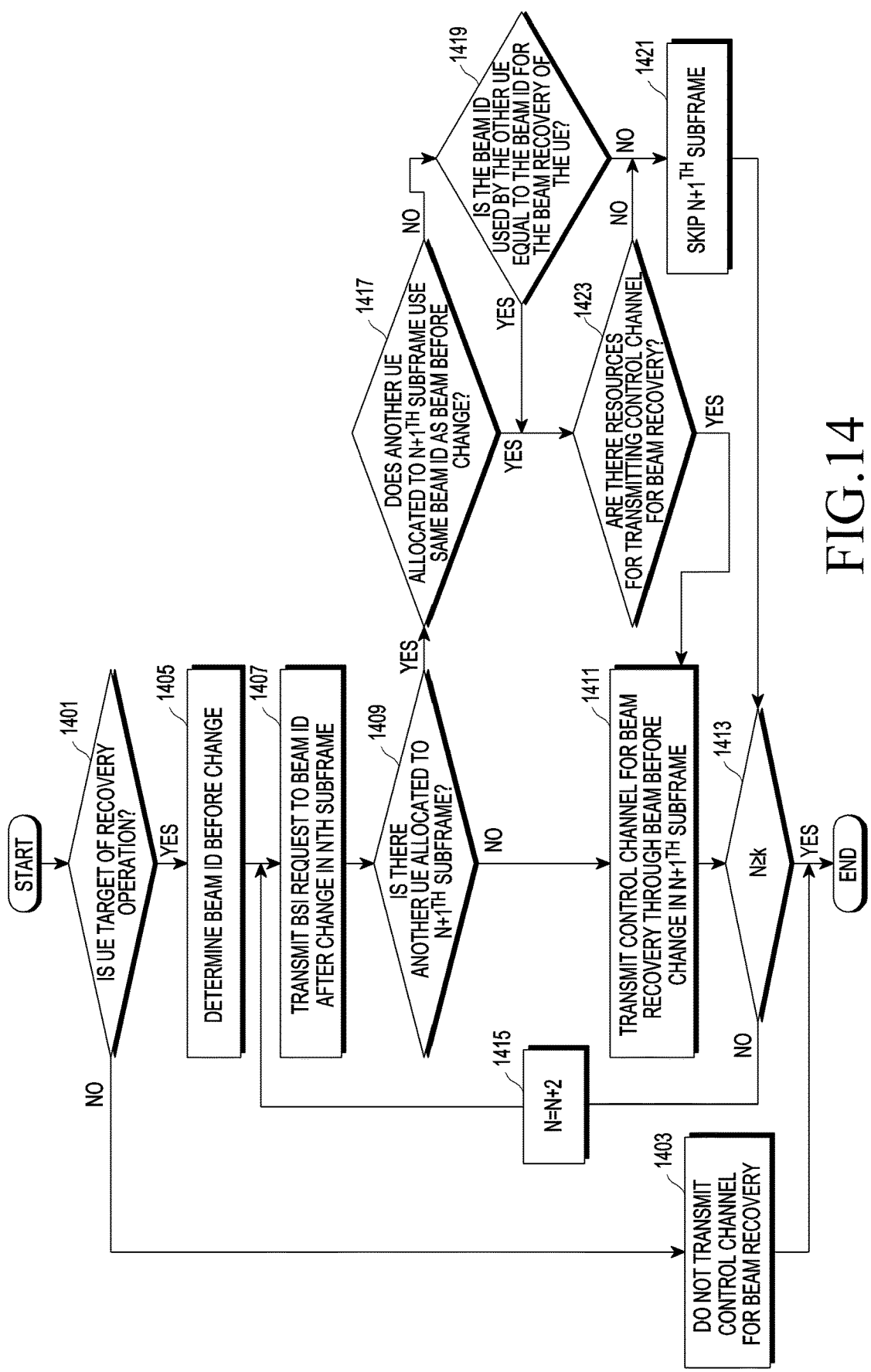

FIG. 14 is a flowchart illustrating a scheduling method of the BS 100 for the beam recovery operation when the number of beam groups operated by the BS is singular and "active transmission of a control channel" is not applied (that is, is off). As described above, subframes such as an Nth subframe and an N+1th subframe do not correspond to all subframes, but may be subframes through which the BSI request is transmitted.

In operation 1401, the BS 100 may determine whether the UE is a target for the recovery operation.

When the UE is not the target for the recovery operation, the BS 100 may not transmit a control channel for beam recovery in operation 1403.

When the UE is the target for the recovery operation, the BS 100 may determine a beam ID before the change in operation 1405. For example, the beam before the change is described as the beam for recovery, though it is understood that one or more other embodiments are not limited thereto.

In operation 1407, the BS 100 may transmit a control channel (for example, a BSI request message) to the beam ID after the change in the Nth subframe. The BS 100 may repeatedly transmit the control channel to the changed beam ID and the control channel for beam recovery to the beam ID before the change.

In operation 1409, the BS 100 may determine whether there is another UE allocated to the N+1th subframe. Specifically, the BS 100 may determine whether a UE having a higher priority than the UE is allocated to the N+1th subframe.

When there is no other UE allocated to the N+1th subframe, the BS 100 may transmit a PDCCH for beam recovery through the beam before the change in operation 1411. In operation 1413, the BS 100 may determine whether N is larger than or equal to a preset value of k. When N is smaller than the preset value of k, the BS 100 may increase N by 2 in operation 1415 and repeat the operations from operation 1407.

When there is another UE allocated to the N+1th subframe, the BS 100 may determine whether the other UE allocated to the N+1th subframe uses the beam ID that is the same as the beam before the change in operation 1417.

When the other UE uses the same beam ID as the beam before the change, the BS 100 may determine whether there are resources for transmission of the control channel for the beam recovery in operation 1423.

When the other UE does not use the same beam ID as the beam before the change, the BS may determine whether the beam ID used by the other UE is the same as the beam ID for the beam recovery of the UE in operation 1419.

When the beam ID used by the other UE is not the same as the beam ID for the beam recovery of the UE (that is, when the UE that is allocated to the N+1th subframe and has a high priority uses a beam other than the beam for the beam recovery and the beam is different from the beam for the beam recovery), the BS 100 may skip the N+1th subframe in operation 1421.

When the beam ID used by the other UE is the same as the beam ID for the beam recovery of the UE (that is, when the UE that is allocated to the N+1th subframe and has a high priority uses a beam other than the beam for the beam recovery and the beam is the same as the beam for the recovery), the BS 100 may determine whether there are resources for transmitting the control channel for the beam recovery in operation 1423.

When the other UE allocated to the N+1th subframe uses the same beam ID as the beam before the change (that is, when the UE that is allocated to the N+1th subframe and has a high priority uses the same beam as the beam for the beam recovery), the BS 100 may determine whether there are resources for transmitting the control channel for the beam recovery in operation 1423. When there are such resources, the BS 100 may transmit the control channel for the beam recovery through the beam before the change in the N+1th subframe in operation 1411. Where are no resources, the BS 100 may skip the N+1th subframe in operation 1421.

Figure 15A:
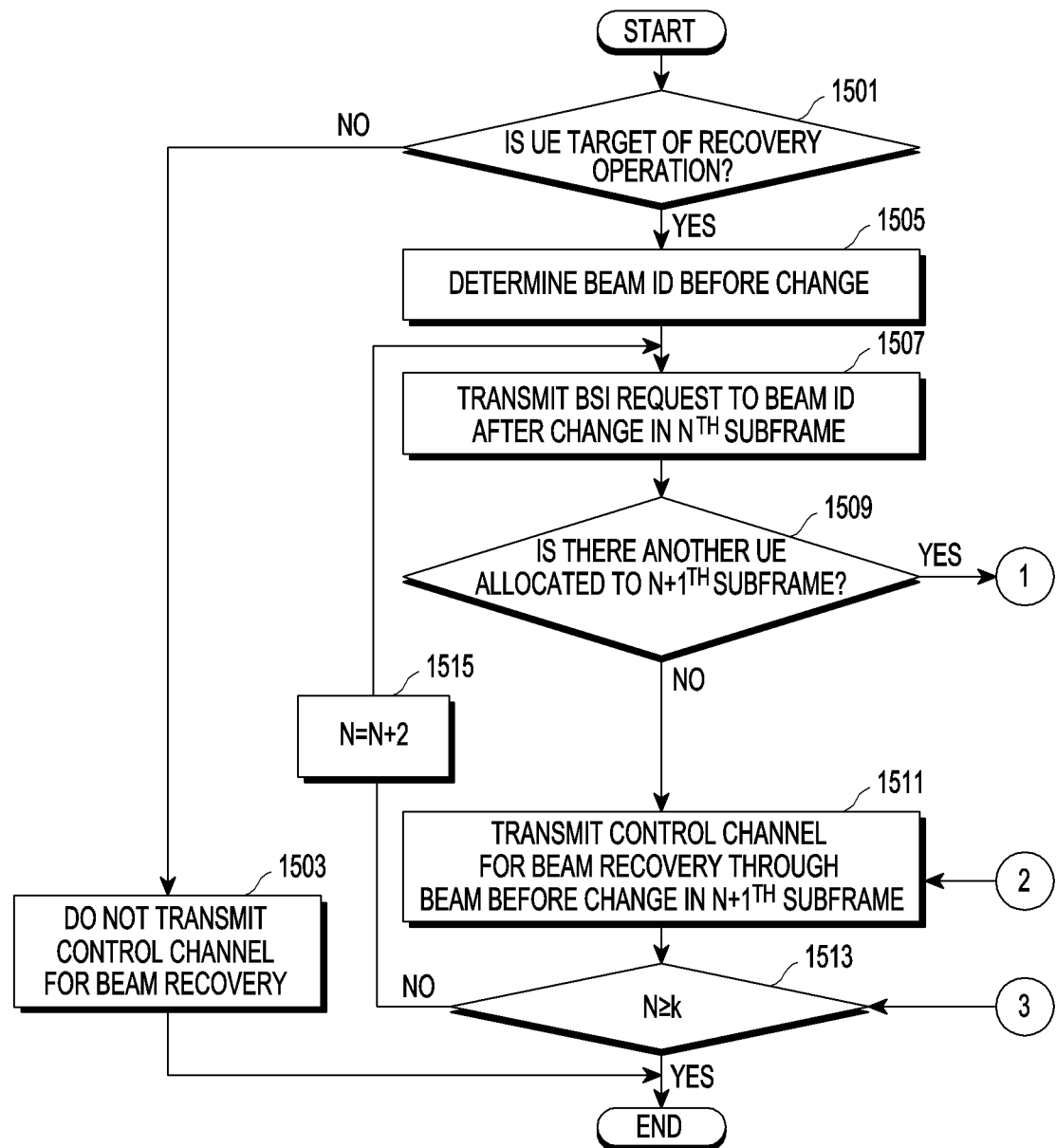
Figure 15B:
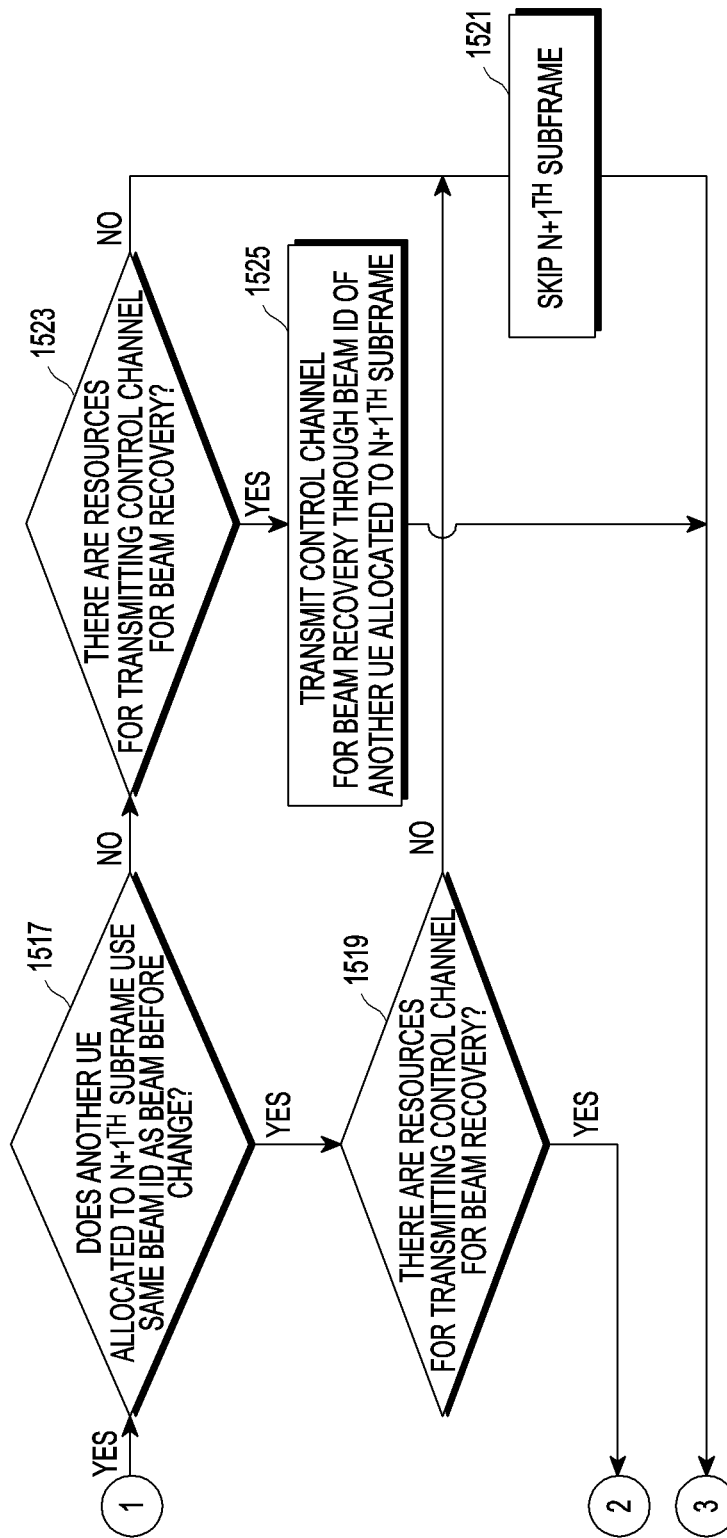

FIGS. 15A to 15B is a flowchart illustrating a scheduling method of the BS 100 for the beam recovery operation when the number of beam groups operated by the BS is singular and "active transmission of a control channel" is applied (that is, is on). As described above, subframes such as an Nth subframe and an N+1th subframe do not correspond to all subframes, but may be subframes through which the BSI request is transmitted.

In operation 1501, the BS 100 may determine whether the UE is a target for the beam recovery operation.

When the UE is not the target for the beam recovery operation, the BS 100 may not transmit a control channel for beam recovery in operation 1503.

When the UE is the target for the recovery operation, the BS 100 may determine a beam ID before the change in operation 1505. For example, the beam before the change is described as the beam for recovery, though it is understood that one or more other embodiments are not limited thereto.

In operation 1507, the BS 100 may transmit a control channel for beam recovery (for example, a BSI request) to the beam ID after the change in the Nth subframe. The BS 100 may repeatedly transmit the control channel to the changed beam ID and the control channel for recovery to the beam ID before the change.

In operation 1509, the BS 100 may determine whether there is another UE allocated to the N+1th subframe. Specifically, the BS 100 may determine whether a UE having a higher priority than the UE is allocated to the N+1th subframe.

When there is no other UE allocated to the N+1th subframe, the BS 100 may transmit the control channel for beam recovery through the beam before the change in operation 1511. As described above, the BS 100 may transmit the control channel several times alternately using the changed beam ID and the existing beam ID (that is, before the change).

In operation 1513, the BS 100 may determine whether to repeatedly perform alternating transmission of the control channel through both beams after and before the change. For example, the BS 100 may determine whether N is larger than or equal to a preset value of k. When N is smaller than the preset value of k, the BS 100 may increase N by 2 in operation 1515 and repeat operations 1507, 1509, and 1511.

Meanwhile, when there is another UE allocated to the N+1th subframe, the BS 100 may determine whether the other UE allocated to the N+1th subframe uses the beam ID that is the same as the beam before the change in operation 1517. When the other UE allocated to the N+1th subframe uses the same beam ID as the beam before the change (that is, when the UE that is allocated to the N+1th subframe and has a high priority uses the same beam as the beam for the beam recovery), the BS 100 may determine whether there are resources for transmitting the PDCCH for the beam recovery in process 1519. When there are resources for transmitting the PDCCH for beam recovery, the BS 100 may transmit the PDCCH for the beam recovery through the beam before the change in the N+1th subframe in operation 1511. When there are no resources for transmitting the PDCCH for beam recovery, the BS 100 may skip the N+1th subframe in the transmission of the control channel for the beam recovery in operation 1521.

When the other UE allocated to the N+1th subframe uses a beam ID different from the beam before the change (that is, when the UE that is allocated to the N+1th subframe and has a high priority uses a beam other than the beam for the beam recovery), the BS 100 may determine whether there are resources for transmitting the PDCCH for the beam recovery in operation 1523. When there are resources for transmitting the PDCCH for beam recovery, the BS 100 may transmit the PDCCH for beam recovery through the beam ID of the other UE allocated to the N+1th subframe in operation 1525. When there are no resources for transmitting the PDCCH for beam recovery, the BS 100 may skip the N+1th subframe in the transmission of the control channel for the beam recovery in operation 1521.

Meanwhile, the BS 100 may control the repetition operation on the basis of a predetermined number of transmissions of the control channel or a predetermined number of subframes. That is, if the BS 100 cannot receive any feedback from the first UE 200-1 even though transmission of the control channel for recovery has been performed during the defined number of control channels for recovery or the number of subframes, the BS 100 may no longer allocate recovery resources to the first UE 200-1. However, when receiving feedback during a predetermined period, the BS 100 may initialize the predetermined number of transmissions of the control channel or the predetermined number of subframes and perform stable support until the beam is recovered.

Specifically, after the beam is changed, the BS 100 may transmit the control channel for beam recovery during the predetermined number (e.g., N_pdcch_tx) of transmissions of the control channel or the predetermined number (e.g., N_subframe_pdcch_tx) of subframes.

When BSI reception fails with a threshold ratio or lower in the changed beam ID 120-5 (that is, when a BSI reception failure rate is equal to or smaller than a threshold value or a BSI reception success rate is larger than or equal to a threshold value), the BS 100 may determine that the beam change is performed normally and thus stops transmitting the beam recovery control channel. For example, when the number of failures is equal to or smaller than a preset number (e.g., N_failure) or when N_failure (the number of reception failures of BSI feedback from the changed beam)/ N_pdcch_tx (the number of actual transmissions of the control channel for beam recovery) is equal to or smaller than a threshold rate, the BS 100 may determine that the beam change is normally performed and thus stops beam recovery control channel transmission. The BS 100 may transmit the control channel only through the changed beam ID 120-5 from the determination time point. At this time, before the condition under which the number of failures in the beam ID 120-5 is equal to or smaller than a preset number (e.g., N_failure) or under which N_failure (the number of reception failures of BSI feedback from the changed beam)/N_pdcch_tx (the number of actual transmissions of the PDCCH for beam recovery) is equal to or smaller than a threshold rate is satisfied, the BS 100 may initialize a count for measuring N_pdcch_tx or N_subframe_pdcch_tx whenever receiving feedback for transmission of the control channel for all beam recovery. Alternatively, when BSI reception is successful with the changed beam ID 120-5 or the beam ID 110-1 for recovery and the beam ID is changed, the BS 100 may stop the beam recovery operation in the corresponding subframe and perform a new beam change process. At this time, successful BSI reception with the changed beam ID 120-5 or the beam ID 110-1 for recovery may mean that a data reception rate using the changed beam ID 120-5 or the beam ID 110-1 for recovery is larger than a preset value or that reception performance is higher than or equal to a preset value.

As described with reference to FIGS. 12 to 14 and 15A to 15B, when a plurality of UEs accesses the BS 100, the recovery operation may be performed in consideration of priorities of other UEs, and thus data transmission and reception of other UEs may not be interrupted.

Figure 16:
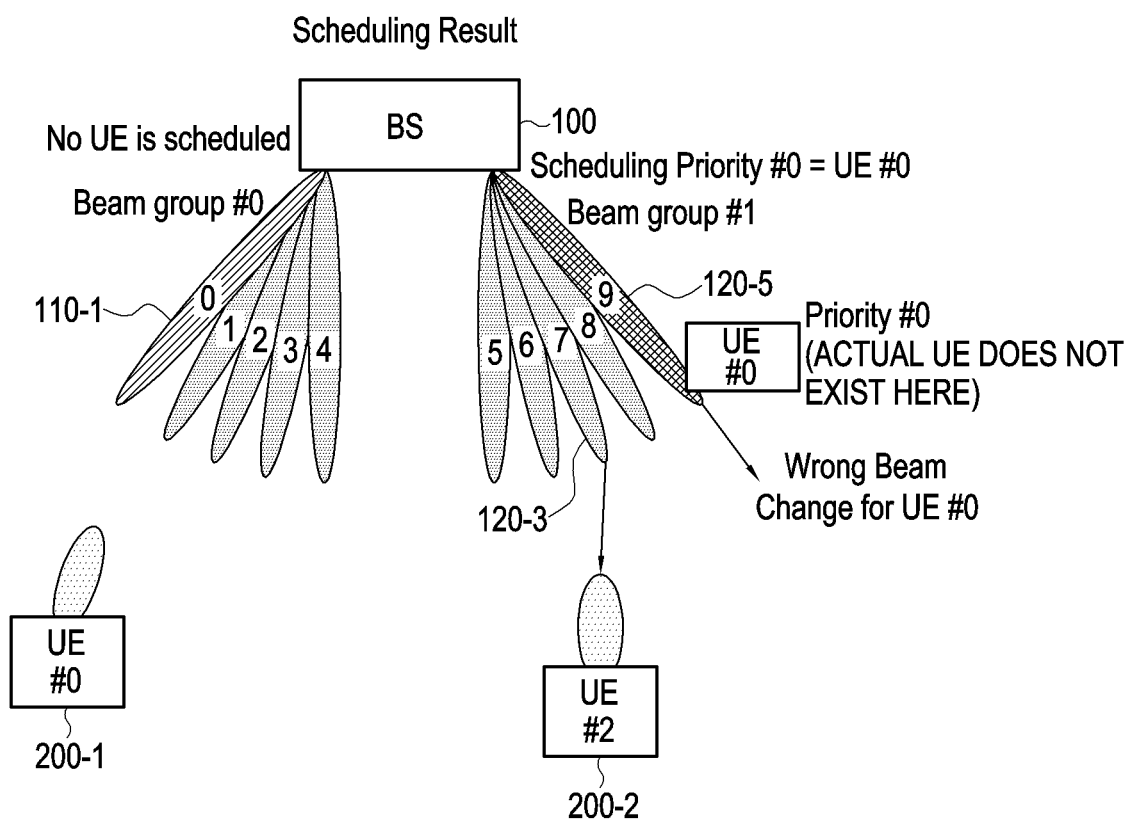
FIGS. 16 to 18 illustrate a beam recovery operation according to one or more embodiments.

FIG. 16 illustrates a detailed example of a case in which a number of beam groups operated by the BS 100 is plural and "active transmission of a control channel" is not applied (that is, is off) according to an embodiment.

Figure 17:
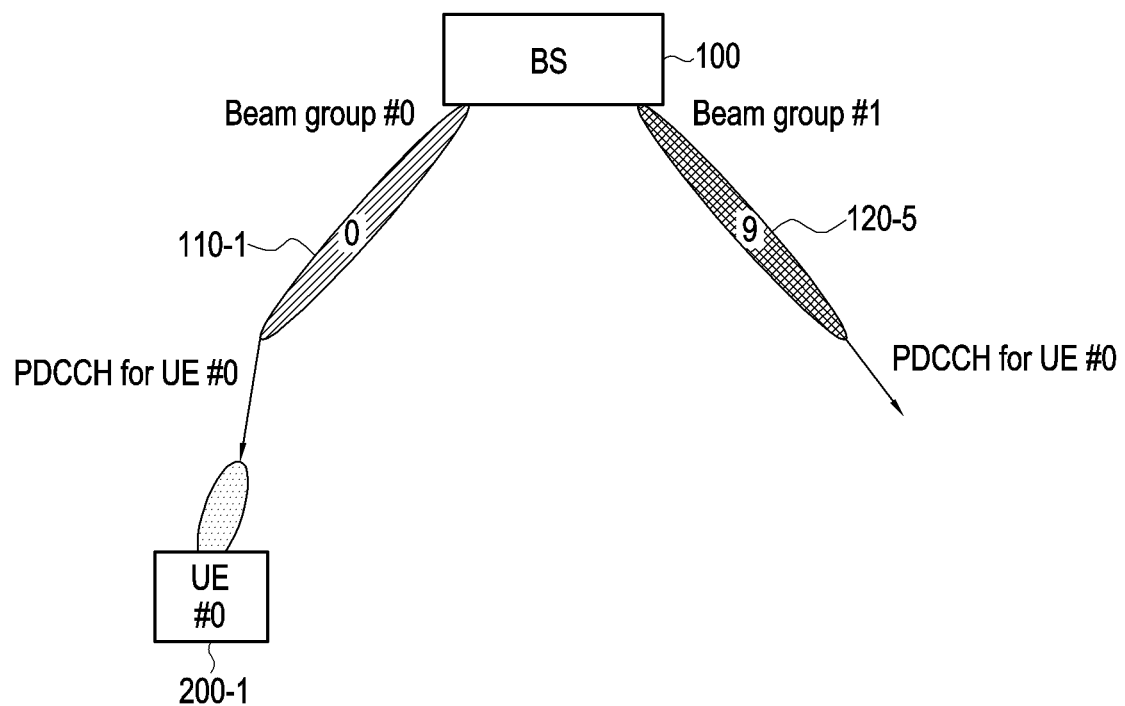
Figure 18:
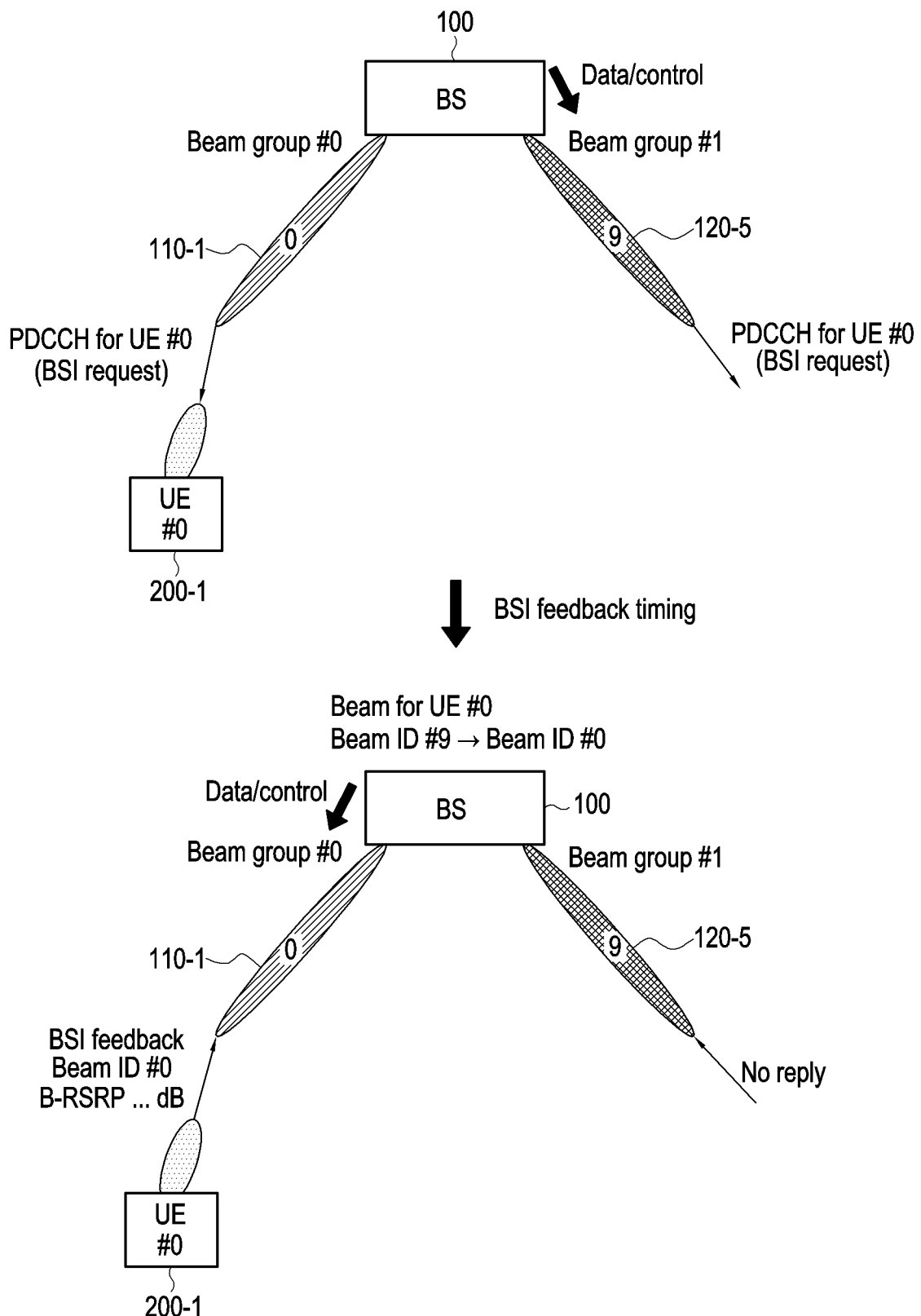

As illustrated in FIG. 16, it is assumed that no terminal except for the first UE 200-1 is scheduled in beam group #0. The BS 100 may determine that the first UE 200-1 and the second UE 200-2 are in beam group #1 due to an incorrect beam change. It is assumed that the priority of the first UE 200-1 is higher than the priority of the second UE 200-2. The BS 100 may transmit a control channel for recovery by the first UE 200-1 to beam group #0. That is, as illustrated in FIG. 17, the BS 100 may transmit the control channel to the first UE 200-1 using both the zeroth beam 110-1 of beam group #0 and the ninth beam 120-5 of beam group #1. The BS 100 may repeatedly transmit the control channel a predetermined number of subframes or a predetermined number of times. As illustrated in FIG. 18, since the BS 100 cannot receive feedback through the ninth beam 120-5 of beam group #1, the BS 100 may determine that the beam change is incorrect and recovers the serving beam (that is, may change from the ninth beam of beam group #1 to the zeroth beam of beam group #0).

Figure 19:
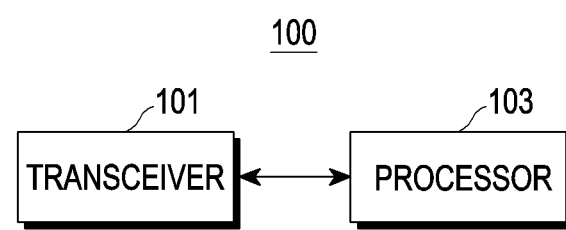
FIG. 19 is a block diagram illustrating a configuration of a BS according to an embodiment.

FIG. 19 is a block diagram illustrating a configuration of a BS 100 according to an embodiment. As illustrated in FIG. 19, the BS 100 includes a transceiver 101 and a processor 103 (e.g., at least one processor).

The transceiver 101 is an element for transmitting and receiving data to and from a UE under the control of the processor 103. In particular, the transceiver 101 may periodically or aperiodically transmit a Beam Reference Signal to the UE and transmit a BSI request that makes a request for BSI feedback. The transceiver 101 may receive BSI feedback of the Beam Reference Signal from the UE.

The processor 103 is an element for controlling the operation of the BS. In particular, the processor 103 may determine optimal beams on the basis of the BSI feedback received from the UE. At this time, the optimal beams may be a pair of beams of the serving BS and the UE at a particular time point or a pair of beams of the BS and the UE having the highest signal quality unless specifically mentioned otherwise, and may be expressed as serving beams or best (or optimal) beams.

The processor 103 may change the serving beams to the determined optimal beams and transmit a beam change indication for changing the serving beams to the UE.

The processor 103 may determine whether the UE is a UE requiring a recovery operation. Specifically, when the channel condition of the first UE is not good (e.g., below a predetermined threshold value or channel condition) or when the first UE is a UE having information on beams received through BSI feedback, the information being highly likely to have an error, the processor 103 may determine that the first UE is a UE requiring a recovery operation.

The processor 103 may manage a plurality of beams serving the UE. For example, the processor 103 may store information on the existing serving beams in the memory although the serving beams of the UE are changed.

When the beam serving the UE that requires the recovery operation is changed, the processor 103 may determine the beam for the beam recovery operation on the basis of the information on the existing serving beams.

Figure 20:
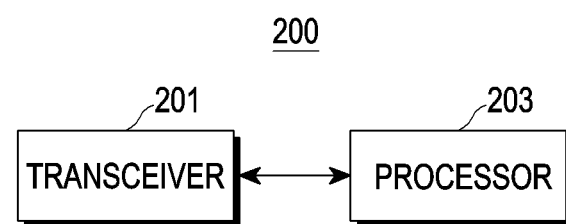
FIG. 20 is a block diagram illustrating a configuration of a UE according to an embodiment.

FIG. 20 is a block diagram illustrating a configuration of a UE 200 according to an embodiment. As illustrated in FIG. 20, the UE 200 includes a transceiver 201 and a processor 203 (e.g., at least one processor).

The transceiver 201 is an element for transmitting and receiving data to and from the BS under the control of the processor 203. In particular, the transceiver 201 may receive a Beam Reference Signal and a BSI request from the BS. The transceiver 201 may transmit BSI feedback of the BSI request to the BS.

The processor 203 is an element for controlling the operation of the UE. In particular, the processor 203 may measure the Beam Reference Signal received from the BS. The processor 203 may measure a beam index corresponding to the Beam Reference Signal and an RSRP, which is a received beam signal level. At this time, in addition to the RSRP, any value corresponding to channel quality information that can be measured may be defined in the standard.

When successfully receiving the beam change indication from the BS, the processor 203 may control the transceiver 201 to transmit an acknowledgement (e.g., ACK) to the BS and then change the serving beams for communication with the BS after a predetermined time (e.g., a time period defined in an applicable standard) passes after ACK transmission.

Figure 21:
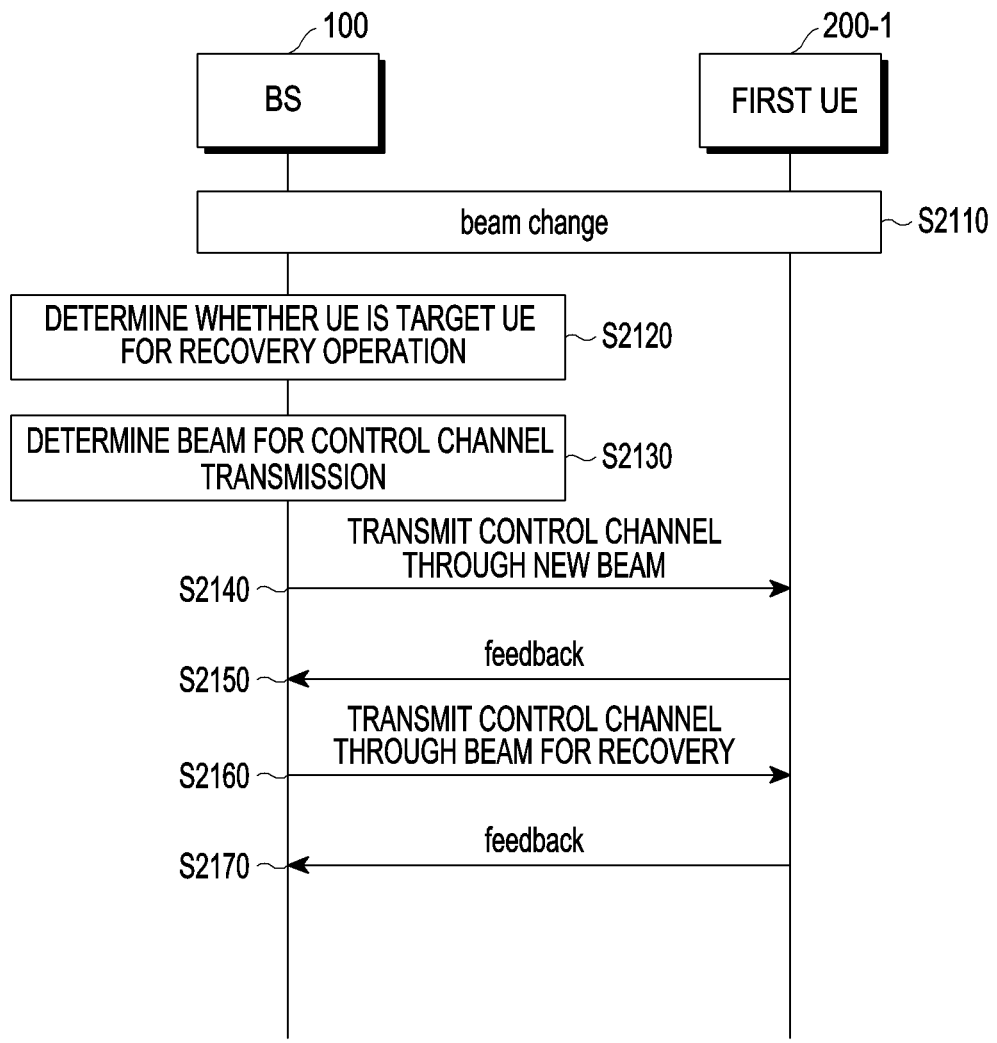
FIG. 21 is a sequence diagram illustrating a method of transmitting a control channel for beam recovery according to an embodiment.

FIG. 21 is a sequence diagram illustrating a method of transmitting a control channel for beam recovery according to an embodiment.

Referring to FIG. 21, the BS 100 and the first UE 200-1 perform a beam change in S2110.

The BS 100 may determine whether the first UE 200-1 is a UE requiring a recovery operation in S2120. Specifically, when the channel condition of the first UE is not good or when the first UE is a UE having information on beams received through BSI feedback that is highly likely to have an error, the BS 100 may determine that the first UE is a UE that requires a recovery operation.

The BS 100 may determine a beam for transmitting a control channel for recovery in S2130. Specifically, the BS 100 may manage a plurality of beams serving the first UE 200-1. For example, the BS 100 may store information on the existing serving beams even though the serving beams of the first UE 200-1 are changed. The BS 100 may determine the beam for the recovery operation on the basis of the stored information on the existing serving beams.

The BS 100 may transmit a control channel through a changed new beam in S2140. Before the beam recovery operation, the BS 100 may determine that the new beam is the optimal beam.

The first UE 200-1 may transmit feedback corresponding to the control channel received through the new beam to the BS 100 in S2150. When the beam change is incorrectly performed, there is no feedback corresponding to the control channel transmitted through the new beam, and thus the BS 100 may receive no feedback.

In S2160, the BS 100 may transmit the control channel through the beam for recovery determined in S2130. At this time, the beam for recovery may be the serving beam. The transmission in S2160 may be performed simultaneously with the transmission in S2140 or may be sequentially performed after S2140.

The first UE 200-1 may transmit feedback corresponding to the control channel received through the beam for recovery to the BS 100 in S2170. The BS 100 may determine whether the beam change is incorrectly performed on the basis of the received feedback and perform the beam recovery operation when the beam change is determined to have been incorrectly performed.

In the above, a component included in the disclosure is expressed in the singular or the plural according to a presented embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. The expression "a first", "a second", "the first", or "the second" used in various embodiments of the disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The terms "module" and "unit" as used herein may include a unit consisting of hardware, software, or firmware, and may, for example, be used interchangeably with the term "logic", "logical block", "component", "circuit", or the like. The "module" or "unit" may be an integrated component, or a minimum unit for performing one or more functions or a part thereof. For example, a module or unit may be an Application-Specific Integrated Circuit (ASIC).

Various embodiments of the disclosure may be implemented by software (for example, programs, instructions, code, etc.) including an instruction stored in machine (for example, computer)-readable storage media (for example, internal memory or external memory). The machine is a device that is capable of retrieving a stored instruction from the storage media and operates according to the retrieved instruction, and may include the UE (for example, the UE 1300 of FIG. 13) according to various embodiments. When the instruction is executed by a processor (for example, the processor 1320 of FIG. 13, the processor 1420 of FIG. 14, or the processor 1520 of FIG. 15), the processor may perform a function corresponding to the instruction directly or the function may be performed using other elements under the control of the processor. The instruction may include a code that is generated or executed by a compiler or interpreter.

The machine-readable storage media may be provided in the form of non-transitory storage media. Here, the term "non-transitory" only means that the storage media is tangible as opposed to only a signal per se, irrespective of whether data is semi-permanently or transitorily stored in the storage media.

The method according to various embodiments disclosed herein may be included and provided in a computer program product. The computer program product may be traded as a product between a seller and a buyer. The computer program product may be distributed in the form of a machine-readable storage medium (e. g., compact disc read only memory (CD-ROM)), or may be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

Each of the elements (e.g., modules or programs) according to various embodiments may include a single entity or multiple entities, and in various embodiments, some sub elements among the above elements may be omitted, or other sub elements may be added. Alternatively or additionally, some elements (e.g., modules or programs) may be integrated into a single element, and the integrated element may still perform the functions performed by each of the corresponding elements in the same or similar manner as before the corresponding elements are integrated. Operations performed by a module, a programming module, or other elements according to various embodiments may be executed sequentially, in parallel, repeatedly, or in a heuristic manner. At least some operations may be executed according to another sequence, may be omitted, or may further include other operations.

While various embodiments have been shown and described above, it will be understood by those skilled in the art that various changes in form and details may be made therein without departing from the scope of the disclosure. Therefore, the scope of the disclosure should not be defined as being limited to the above embodiments, but should be defined by the appended claims and equivalents thereof.

What is claimed is:

1. A method of transmitting a control channel by a Base Station (BS), the method comprising:
   receiving, from a User Equipment (UE) through at least one first beam, Beam State Information (BSI);
   identifying a second beam, based on the BSI;
   transmitting, to the UE through the second beam, a first BSI request;
   identifying a third beam, based on information on the at least one first beam; and
   determining whether to transmit, to the UE through the third beam, the control channel based on a rate of data reception from the UE through the at least one first beam being less than or equal to a first threshold value or based on a reception performance using the at least one first beam being less than or equal to a second threshold value.

2. The method of claim 1, wherein the determining whether to transmit the control channel comprises, based on no other UE having a higher priority than the UE, according to scheduling of a first beam group including the third beam, determining to transmit the control channel to the UE through the third beam.

3. The method of claim 1, wherein:
   the determining whether to transmit the control channel comprises, based on a priority of the UE being lower than a priority of another UE that uses a fourth beam included in a first beam group, determining to transmit the control channel through the fourth beam; and
   the first beam group comprises the third beam and the fourth beam.

4. The method of claim 1, wherein the identifying the third beam comprises storing information on each of the at least one first beam for transmitting a second BSI request during a predetermined time period from a time at which the second BSI request is transmitted.

5. The method of claim 1, wherein:
   the determining whether to transmit the control channel comprises receiving a BSI request feedback from the UE through the third beam; and
   the control channel includes the first BSI request.

6. The method of claim 1, further comprising, based on a success rate of data reception from the UE using the second beam being greater than or equal to the first threshold value or based on a reception performance using the second beam being greater than or equal to the second threshold value, stopping transmitting the control channel through the third beam.

7. The method of claim 1, further comprising switching a method of transmitting the first BSI request.

8. The method of claim 1, wherein the second beam and the third beam belong to different beam groups, and the first BSI request and the control channel are transmitted in a same time resource.

9. The method of claim 1, wherein the second beam and the third beam belong to a same beam group, and the first BSI request and the control channel are transmitted in different time resources.

10. The method of claim 1, further comprising:
    receiving, from the UE through the second beam, a BSI request feedback for the first BSI request; and
    determining whether to transmit the control channel through the third beam,
    wherein the determining of whether to transmit the control channel through the third beam comprises, based on a beam included in the BSI request feedback for the first BSI request belonging to a beam group different from the second beam, determining to transmit the control channel through the third beam.

11. A Base Station (BS) for transmitting a control channel, the BS comprising:
    a transceiver; and
    at least one processor configured to:
       control the transceiver to receive, from a User Equipment (UE) through at least one first beam, Beam State Information (BSI),
       identify a second beam, based on the BSI,
       control the transceiver to transmit, to the UE through the second beam, a first BSI request,
       identify a third beam, based on information on the at least one first beam, and determine whether to control the transceiver to transmit, to the UE through the third beam, the control channel based on a rate of data reception from the UE through the at least one first beam being less than or equal to a first threshold value or based on a reception performance using the at least one first beam being less than or equal to a second threshold value.

12. The BS of claim 11, wherein the at least one processor is further configured to, based on no other UE having a higher priority than the UE, according to scheduling of a first beam group including the third beam, determine to control the transceiver to transmit the control channel to the UE through the third beam.

13. The BS of claim 11, wherein:
the at least one processor is further configured to, based on a priority of the UE being lower than a priority of another UE that uses a fourth beam included in a first beam group, determine to control the transceiver to transmit the control channel through the fourth beam; and
the first beam group comprises the third beam and the fourth beam.

14. The BS of claim 11, wherein the at least one processor is further configured to control to store information on each of the at least one first beam for transmitting a second BSI request during a predetermined time period from a time at which the second BSI request is transmitted.

15. The BS of claim 11, wherein the at least one processor is further configured to determine, as the third beam, one of a most recently used beam and a beam having a highest reception performance value among the at least one first beam, based on the information on the at least one first beam.

16. The BS of claim 11, wherein:
the at least one processor is further configured to control the transceiver to receive a BSI request feedback from the UE through the third beam; and
the control channel includes the first BSI request.

17. The BS of claim 11, wherein the at least one processor is further configured to, based on a success rate of data reception from the UE using the second beam being greater than or equal to the first threshold value or based on a reception performance using the second beam being greater than or equal to the second threshold value, control the transceiver to stop transmitting the control channel through the third beam.

18. The BS of claim 11, wherein the at least one processor is further configured to switch a method of transmitting the first BSI request.

19. The BS of claim 11, wherein the second beam and the third beam belong to different beam groups, and the first BSI request and the control channel are transmitted in a same time resource.

20. The BS of claim 11, wherein the second beam and the third beam belong to a same beam group, and the first BSI request and the control channel are transmitted in different time resources.

21. A method of receiving a control channel by a User Equipment (UE), the method comprising:
transmitting, to a Base Station (BS) through at least one first beam, Beam State Information (BSI);
receiving, from the BS through a second beam, a BSI request; and
receiving, from the BS through a third beam, the control channel,
wherein the second beam is identified based on the BSI and the third beam is identified based on information on the at least one first beam, and
wherein the control channel is transmitted in case that a rate of data reception from the UE through the at least one first beam is less than or equal to a first threshold value or in case that a reception performance using the at least one first beam is less than or equal to a second threshold value.

22. A User Equipment (UE) for receiving a control channel, the UE comprising:
a transceiver; and
at least one processor configured to:
control the transceiver to transmit, to a Base Station (BS) through at least one first beam, Beam State Information (BSI),
control the transceiver to receive, from the BS through a second beam, a BSI request, and
control the transceiver to receive, from the BS through a third beam, the control channel,
wherein the second beam is identified based on the BSI and the third beam is identified based on information on the at least one first beam, and
wherein the control channel is transmitted in case that a rate of data reception from the UE through the at least one first beam is less than or equal to a first threshold value or in case that a reception performance using the at least one first beam is less than or equal to a second threshold value.

* * * * *